United States Patent
Ohtsu et al.

(10) Patent No.: US 7,487,074 B2
(45) Date of Patent: Feb. 3, 2009

(54) ROAD TRAFFIC SIMULATION APPARATUS

(75) Inventors: Akihiko Ohtsu, Saitama (JP); Toyotaka Torii, Saitama (JP); Yasuhiro Sawada, Saitama (JP); Katsuyoshi Watari, Saitama (JP); Yuichi Hashimoto, Saitama (JP); Mitsuhide Kuroda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 741 days.

(21) Appl. No.: 10/738,661

(22) Filed: Dec. 16, 2003

(65) Prior Publication Data
US 2004/0176936 A1 Sep. 9, 2004

(30) Foreign Application Priority Data
Dec. 17, 2002 (JP) ............................. 2002-365708

(51) Int. Cl.
G06G 7/48 (2006.01)
(52) U.S. Cl. ............................. 703/8; 703/6; 701/200; 701/201; 701/117; 463/6
(58) Field of Classification Search ................ 701/117, 701/201, 200; 434/29, 63, 61; 703/8, 6; 455/456.5
See application file for complete search history.

(56) References Cited

U.S. PATENT DOCUMENTS

| 5,177,685 | A  | * | 1/1993  | Davis et al. ............... 455/456.5 |
| 5,660,547 | A  | * | 8/1997  | Copperman .................. 434/29 |
| 6,028,550 | A  | * | 2/2000  | Froeberg et al. ........ 342/357.13 |
| 6,580,973 | B2 | * | 6/2003  | Leivian et al. ................. 701/1 |
| 6,587,781 | B2 | * | 7/2003  | Feldman et al. ............. 701/117 |
| 6,679,702 | B1 | * | 1/2004  | Rau ............................ 434/29 |
| 6,950,788 | B2 | * | 9/2005  | Faghri ........................... 703/8 |
| 7,155,376 | B2 | * | 12/2006 | Yang et al. ..................... 703/8 |
| 2002/0026278 | A1 | * | 2/2002  | Feldman et al. ............. 701/117 |
| 2002/0062207 | A1 | * | 5/2002  | Faghri ........................... 703/8 |
| 2002/0120374 | A1 | * | 8/2002  | Douros et al. ................. 701/29 |
| 2002/0146667 | A1 | * | 10/2002 | Dowdell et al. ............... 434/62 |

(Continued)

FOREIGN PATENT DOCUMENTS

JP 06-259407 9/1994

(Continued)

OTHER PUBLICATIONS

Mariana Tartaro, Gabriel Wainer, and Cesar Torres☐☐Defining Models of Urban Traffic Using the TSC Tool ☐☐Proceedings of the 2001 Winter Simulation conference, 2001, pp. 1056-1063.*

(Continued)

*Primary Examiner*—Kamini S Shah
*Assistant Examiner*—Cuong V Luu
(74) *Attorney, Agent, or Firm*—Fenwick & West LLP

(57) ABSTRACT

In a road traffic simulation apparatus that expresses a plurality of mobile units and road traffic environments on a computer to simulate traffic situations in association with a plurality of mobile units, each of the mobile units is expressed by a combination of a driver model, a model of driving operations of a virtual driver, and a vehicle dynamics model, a model of physical behaviors of a mobile unit. The mobile units are programmed to travel independently to each other in a road traffic environment that is expressed on the computer.

18 Claims, 17 Drawing Sheets

U.S. PATENT DOCUMENTS

2002/0198694 A1* 12/2002 Yang et al. .................... 703/6
2003/0069683 A1* 4/2003 Lapidot et al. .............. 701/117
2003/0109982 A1* 6/2003 Burt et al. ................... 701/200

FOREIGN PATENT DOCUMENTS

| JP | 09-113297 | 5/1997 |
|---|---|---|
| JP | 11-272158 | 10/1999 |
| JP | 2001-229483 | 8/2001 |
| JP | 2002-157673 | 5/2002 |

OTHER PUBLICATIONS

Norrih Valayden et al. Control and Validation of Expert Tasks for a Collision Avoidance System IEEE 07803-3652-6/96, 1996.*

* cited by examiner (a)

(b)

ROAD TRAFFIC SIMULATION APPARATUS

BACKGROUND OF THE INVENTION

The present invention relates to a road traffic simulator for performing a simulation regarding the traffic by running autonomously a vehicle that simulates a real vehicle behavior in a simulated road environment on a computer.

In planning a road traffic system, it is important to make an assessment in advance as to what effect can be expected from a specific plan relating to a part or whole of the traffic system (for example, likelihood of traffic jam). Accordingly, there has been conventionally developed a micro traffic simulation system that replicates a behavior of a vehicle on a computer to simulate the conditions of the traffic flow and/or the traffic jam to assist designing or assessment of a road traffic system.

In a typical micro traffic simulation apparatus, a speed or acceleration of a vehicle is calculated to update a location of the vehicle according to such detailed rules as: (1) when there are no other vehicles in front of the subject vehicle, the subject vehicle travels freely according to a speed limit of a lane or a speed set for the vehicle; (2) when there is another vehicle, an obstacle or a traffic light in the traveling direction of the subject vehicle, the subject vehicle accelerates, decelerates or stops in accordance with the speed or distance relative to such object in front of it; and (3) in case of turning to right or left, passing an obstacle and changing lanes, the subject vehicle takes a predetermined behavior as long as a relation with an oncoming car on an opposite lane, an obstacle or the like is in conformance with a predetermined condition.

According to such typical micro traffic simulation apparatus, since a car speed and acceleration is calculated for predetermined conditions, it is hard to simulate behaviors of an actual vehicle driver with respect to operation of a steering wheel, accelerator pedal and braking pedal. Likewise, behaviors of a car resulting from such driver's behaviors cannot be adequately simulated.

The Japanese Patent Application Unexamined Publication (Kokai) No. H11-272158 discloses a technique for preparing minute coordinates in order to incorporate a driving simulator that has a higher degree of freedom than a micro traffic simulation apparatus. But, it does not include details of vehicle behaviors.

Besides, the Japanese Patent Application Unexamined Publication (Kokai) No. 2002-157673 discloses a road traffic simulation system in which a specific vehicle among the vehicles under simulation is assigned as a driving simulation vehicle so that a traffic simulation function and the assigned vehicle can exchange necessary information. In this traffic simulation system, a person under test is requested to use the driving simulator to drive the simulation vehicle repeatedly in various traffic conditions so that the information about the environmental conditions and the driver's operations under those conditions can be obtained. Based on the obtained information, a driving behavior model is generated and the generated model is reflected to the vehicle behavior model for a simulation vehicle of the traffic simulation apparatus. By running the simulation vehicle based on this model, it is possible to realize a simulator in which the behavior of the simulation vehicle in various traffic environments can be simulated in detail.

However, the position of the vehicle in the micro traffic simulation apparatus is updated in accordance with the acceleration and/or speed in the forward/backward directions and a selected traveling lane. As a result, the vehicle travels along a predetermined track.

According to the traffic simulation apparatus of H11-272158, a vehicle can travel over any position on the road because the behavior of the vehicle generated by the driving simulator connected to the traffic simulation apparatus is defined with distance and angle. However, the positions of other vehicles are confined to their predetermined track because their positions are updated in accordance with the lane number and acceleration. Accordingly, it is not possible to simulate in detail the lateral fluctuation of the vehicle within a lane and various tracks in a road crossing.

In the system of the Kokai 2002-157673, a vehicle is divided into a vehicle and a driver. The driver's steering, accelerating and braking operations are incorporated into a driver model. However, with this model, freedom of the driver's behavior is rather small because the model is relatively simple. Besides, as to the vehicle, the disclosed system uses a vehicle model database in which the relations of driver behaviors and vehicle behaviors caused with the driver behaviors are described. Accordingly, the vehicle behaviors are limited to the behaviors described in the database. This approach cannot simulate the conditions which are not described in the database.

Thus, there exists a need for such road traffic simulation apparatus that can perform a vehicle simulation with a higher freedom of behaviors without pre-classifying the traffic environments and pre-defining the traveling rules to cope with the pre-classified environments.

SUMMARY OF THE INVENTION

The present invention provides a road traffic simulation apparatus for simulating various traffic situations by running a plurality of mobile units such as vehicles or the like in a virtual traffic environment that is constructed based on a database. According to this traffic simulation apparatus, it is possible to simulate more detailed vehicle behaviors by providing each mobile unit with both a "driver model" and a "vehicle dynamics model" which are independent to each other and sending outputs from the driver model in various traffic environments to the vehicle dynamics model as its input.

According to one aspect of the present invention, there is provided a road traffic simulation apparatus that expresses a plurality of mobile units and road traffic environments on a computer to simulate traffic situations that may happen in association with the mobile units. In the simulation apparatus, each of the mobile units is expressed by a mobile unit model that is a combination of a driver model for modeling driving operations of a virtual driver and a vehicle dynamics model for modeling physical behaviors of each mobile unit. The mobile units travel independently to each other in a road traffic environment that is represented on the computer.

According to the invention, in the road traffic simulation apparatus that simulates the mutual relationship of the road traffics of a plurality of mobile units, each mobile unit is configured by a combination of a driver model, a model of driving operations of a driver, and a vehicle dynamics model, a model of behaviors of a mobile unit. Each mobile unit travels individually in a simulation environment. Thus, flexible representation of vehicle behaviors can be made.

The road traffic simulation apparatus has a road traffic environment database, which includes passable zone data for representing areas in which the mobile units can travel freely and impassable zone data for representing impassable zones in which the mobile units cannot travel or their free travel is restricted. The impassable zone data covers two types of areas. One type is an area which mobile units cannot travel through, for example, an out-of-road zone such as building, walkway and a central road-dividing zone. The other type is a travel restricting area in which free traveling of mobile units is restricted (in other words, mobile units do not necessarily travel through this type of area unless particularly needed), such as a lane-dividing line. The passable zone data and the impassable zone data are preferably two-dimensional map data.

The road traffic environment database may include road facilities status data in which multiple patterns are provided for various operating status of traffic regulations and/or the road facilities. The operating status of traffic regulations includes such time-dependent regulation as no passing or no lane-changing which may be set according to the time zone, and the operating status of road facilities includes traffic lights that are periodically switched in a given timing.

When the speed and/or the direction of the mobile unit in the road traffic environment are determined during the execution of the road traffic simulation, impassable zones, operating status of traffic regulations and road facilities as well as travel of other traffic mobiles are uniformly expressed by respective impassability levels, each of which represents a level of impassability for each mobile unit to travel through a relevant area. This way, such physical obstacles as out-of road zones, other mobile units and the like and operating status of traffic regulations and/or lights are uniformly expressed using a common measurement, making it unnecessary to pre-classify traffic environments that mobile units may encounter and to associate the classified environments with behaviors of mobile units. A impassability level is represented by a numerical value having, for example, a range of [0,1].

In practice, an impassability level is preferably converted to an impassability level from driver's view in accordance with a distance between the mobile unit and the relevant impassable zone. The driver model autonomously determines a speed and a direction for each mobile unit model to travel with based on the impassability level from driver's view.

The driver model converts the determined speed and direction into a driving operation value to be provided to the vehicle dynamics model. The driving operation value refers to, for example, an operation angle for the steering wheel, an operation value for the braking pedal and the accelerator pedal or the like.

The impassability levels are calculated in accordance with certain rules. Accordingly, the regions to be covered by the execution of the road traffic simulation can readily be expanded because roads and/or buildings, traffic facilities on the map are uniformly converted into impassability levels.

Each of the vehicle dynamics models is a high freedom model that has a precision to allow for use in a driving simulator. Accordingly, a driving simulator can be incorporated into the road traffic simulation apparatus. As for the driving simulator, inputs corresponding to driving operations of an operator of the driving simulator are provided directly to the vehicle dynamics model for at least one of the multiple mobile units. Accordingly, the operator of the driving simulator can virtually travel through the road traffic environment that is represented on a computer.

Parameters for determining a behavior of both or either of the driver model and the vehicle dynamics model can be different for each mobile unit model. Accordingly, a road traffic environment in which various drivers having various personality types co-exist can be included in the simulation.

According to another aspect of the present invention, there is provided a road traffic simulation program that is configured to express a plurality of mobile units and road traffic environments on a computer and simulate traffic situations that may happen in association with the mobile units. In this simulation program, each of the mobile units is represented by a mobile unit model that is a combination of a driver model, a model of driving operations of a virtual driver, and a vehicle dynamics model, a model of a physical behavior of each mobile unit. The mobile units travel independently to each other in a road traffic environment that is expressed on the computer. This program can include functions corresponding to structures of the above-described road traffic simulation apparatus.

DESCRIPTION OF THE PREFERRED EMBODIMENTS

Preferred embodiments of the present invention will now be described with reference to the accompanying drawings.

1. Overall Structure

Figure 1:
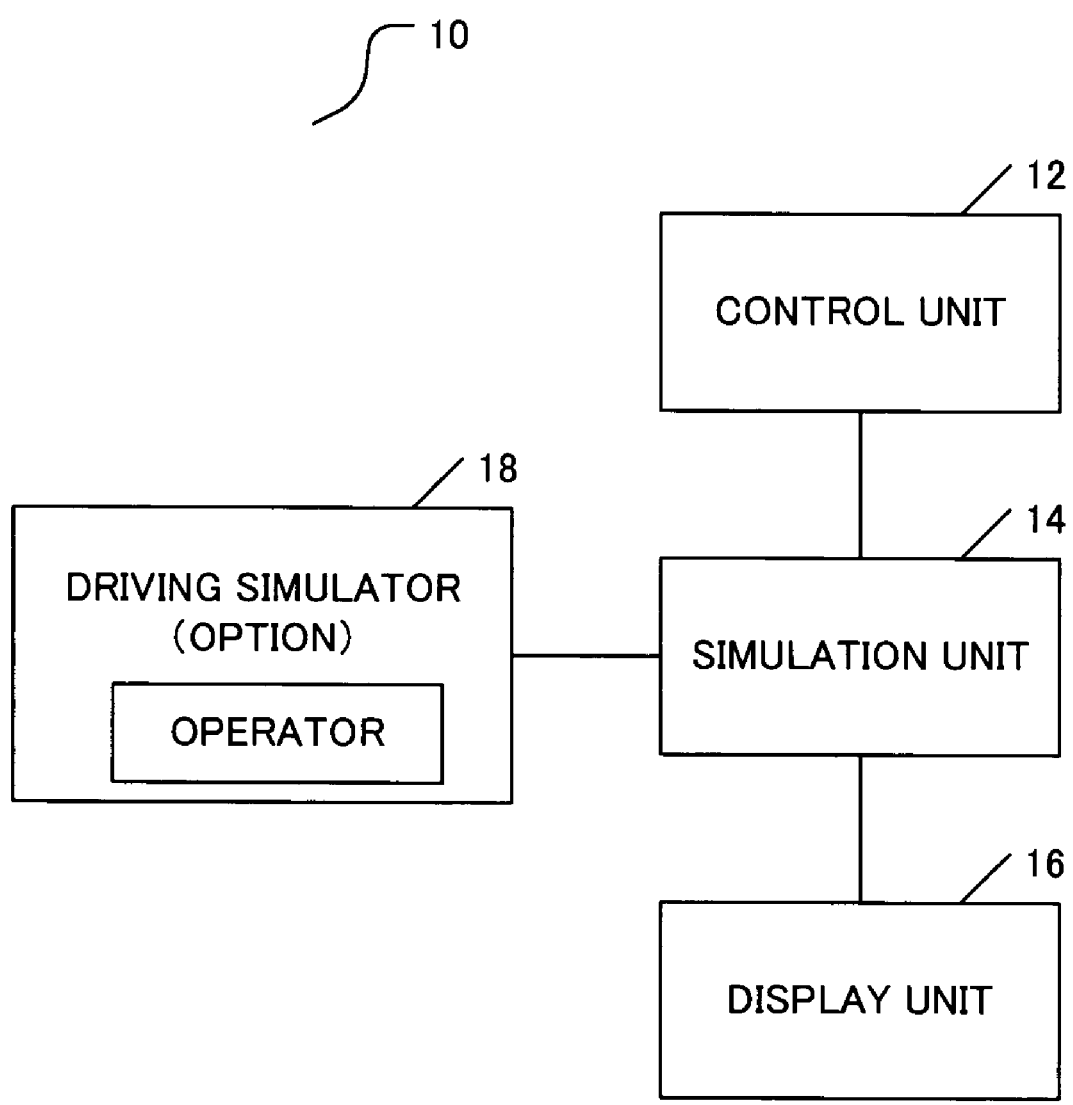
FIG. 1 shows a functional block diagram of a road traffic simulation apparatus in accordance with one embodiment of the present invention.

FIG. 1 shows a functional block diagram of a road traffic simulation apparatus 10 in accordance with one embodiment of the present invention. In the following description, the road traffic simulation apparatus in accordance with the present invention will be referred to as a "nano traffic simulator" in order to distinguish it from conventional micro traffic simulators. The nano traffic simulator 10 expresses, on a computer, a plurality of mobile units (such as four-wheel vehicles and two-wheel vehicles), and road traffic environments (such as roadways, walkways, buildings and traffic lights). It computes the behaviors (such as position, speed, acceleration and direction) of the plurality of the mobile units traveling in the road traffic environments to simulate traffic situations that may happen in association with the mobile units. The nano traffic simulator 10 includes a control unit 12, a simulation unit 14 and a display unit 16.

The control unit 12 controls such operation as start/stop of the road traffic simulation that is performed in the simulation unit 14. The control unit 12 further controls switching operations for various conditions in the simulation unit 14 and it also controls various parameters regarding the places where multiple mobile units should be generated, the number of the vehicles to be generated and/or the generation timing.

The simulation unit 14 periodically computes the behaviors of the plural mobile units which travel in the road traffic environment that is virtually expressed on the computer and determines the positions and/or the speeds of the mobile units in the road traffic environments. The structure of the simulation unit 14 will be described later with reference to FIG. 2.

The display unit 16 displays road traffic environments such as shapes of roads, buildings, operating status of traffic signs, traffic lights and the like. The display unit 16 also displays each of the mobile units at the respective positions computed by the simulation unit 14.

The nano traffic simulator 10 is used specifically to simulate the flow of the traffic and/or the traffic jam prediction under various traffic environments (for example, at a road crossing (see FIG. 17) or in the vicinity of a tollgate in an expressway) by running the multiple mobile units autonomously in such traffic environments.

A driving simulator 18 may be optionally incorporated into the nano traffic simulator 10. The driving simulator 18 is provided with such control input devices as steering wheel, accelerator pedal, braking pedal or the like of conventional four-wheeled or two-wheeled vehicles. A display device such as a screen is provided in front of an operator of the driving simulator 18 in order to display a three-dimensional picture that simulates a scene that is expected to be seen by a virtual driver of a specific mobile unit among the plural mobile units simulated in the nano traffic simulator 10. This specific mobile unit is assigned by an operator of the driving simulator 18. The operator looks over the scene and operates such control input device as steering wheel, accelerator pedal, braking pedal and so on in order to control the movement of the mobile unit. Analog signals obtained from the control input devices are converted to digital signals and then provided to the simulation unit 14.

By incorporating the driving simulator 18 into the nano traffic simulator 10, the operator of the driving simulator 18 can participate in a virtual road traffic environment that is computed by the simulation unit 14. Furthermore, it is possible to perform a more realistic driving training through use of the driving simulator 18. The driving simulator 18 can be also applied to some games.

Figure 2:
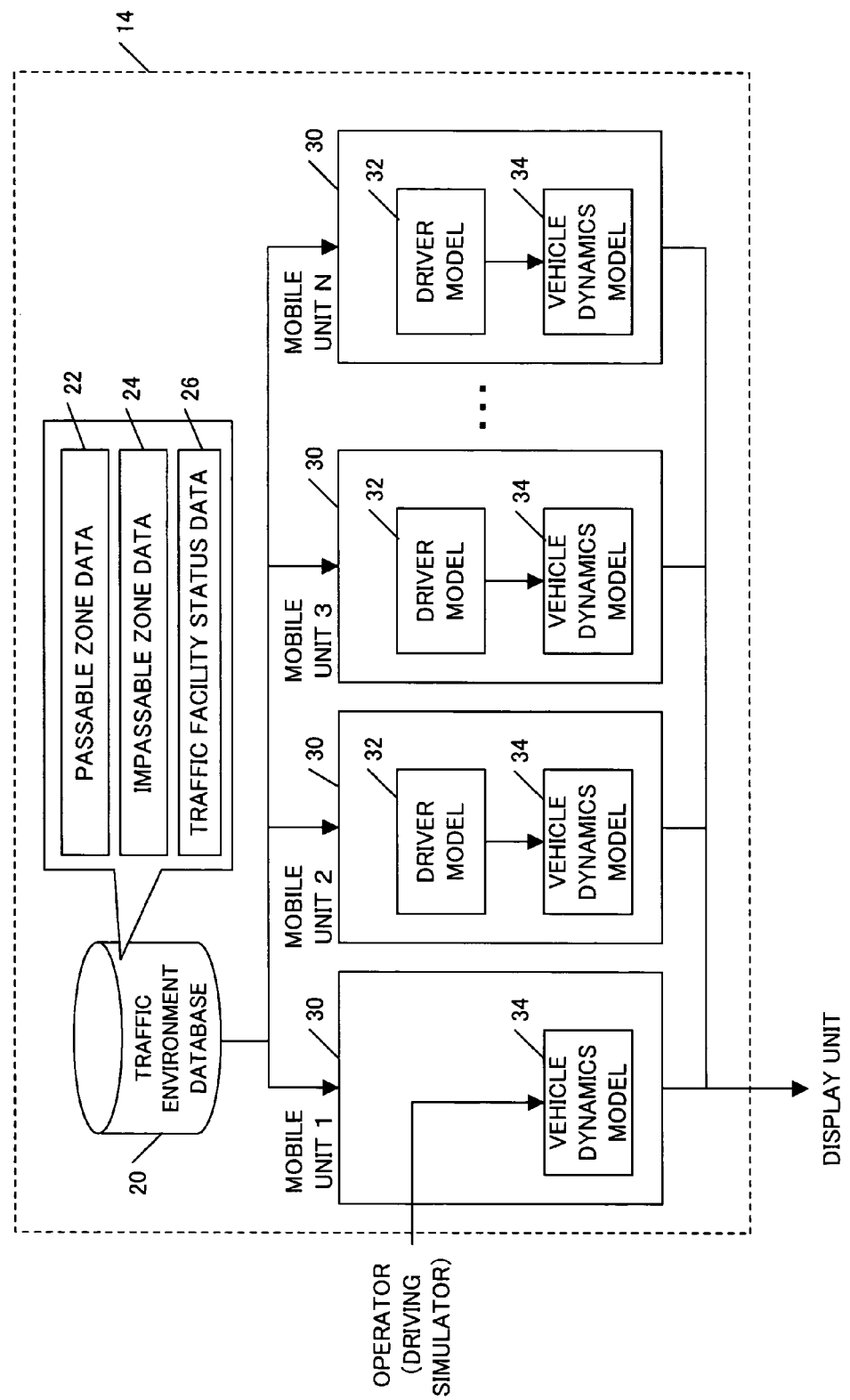
FIG. 2 shows a functional block diagram of the simulation unit.

FIG. 2 is a functional block diagram of the simulation unit 14. The simulation unit 14 includes a road traffic environment database 20 and a plurality of mobile unit models 30. The number of the mobile unit models 30 to be generated is equal to the number of the mobile units which are to appear in the road traffic environment. In the example of FIG. 2, N (1, 2, . . . , N) mobile unit models 30 are generated. Each of these mobile unit models is generated or deleted at any time as it flows in or flows out the road traffic environment. Each of the mobile unit models 30 contains a respective driver model 32 and a respective vehicle dynamics model 34, both of which are independent computed models. In a driver model 32, driving operations by a virtual driver are modeled. On the other hand, in a vehicle dynamics model 34, physical behaviors of each mobile unit are modeled. Thus, each mobile unit is provided with a respective driver model and a respective vehicle dynamics model, so that the nano traffic simulator 10 in accordance with the present invention allows for each mobile unit appearing in the road traffic environment to make a complicated behavior as if it were operated by a real driver with personality. The driver model 32 and the vehicle dynamics model 34 will be described later with reference to the accompanying drawings.

When the driving simulator 18 is incorporated into the nano traffic simulator 10, inputs by an operator of the driving simulator are input to the vehicle dynamics model 34 of one of the mobile unit models 30. In FIG. 2, it is the case that the mobile unit 1 is operated by the operator of the driving simulator 18. Since each mobile unit is thus associated with a respective driver model, the operator of the driving simulator can easily participate in the road traffic environment by substituting the input from the external operator with the driver model. Of course, the driver models in the multiple mobile models may be substituted by the input from the external operator.

The nano traffic simulator 10 is specifically implemented through a computer having a CPU, a ROM and a RAM as well as a display device for displaying simulation results. When the nano traffic simulator 10 has the driving simulator 18, the display device of the driving simulator 18 may be substituted for the display unit 16. Besides, the nano traffic simulator 10 may be implemented in a distributed system where the control unit 12, the simulation unit 14 and the display unit 16 may exchange data each other using a known communication protocol.

An outline of a road traffic simulation process in the nano traffic simulator 10 will now be described with reference to a flowchart of FIG. 3. A series of these processes are performed with an appropriate time cycle in accordance with the processing performance of the computer.

When the control unit 12 starts a simulation, the simulation unit 14 establishes a path point where the subject mobile unit should next pass (S52). Then, direction, speed and current position of the mobile unit are computed based on the path point (S54, a path tracking process). This process will be described later with reference to FIG. 7 and FIG. 8. Subsequently, an "impassability level from driver's view" is computed, which is an index indicating passability from a viewpoint of the mobile unit (S56, a impassable area detecting process). This process will be described later with reference to FIG. 9 and FIG. 10. Furthermore, based on the impassability level from driver's view, a target direction and a target speed of the mobile unit are computed (S58, an target value generating). This process will be described later with reference to FIG. 11 through FIG. 13. Finally, an operation output value to be given to the vehicle dynamics model is computed (S60, a vehicle operating process). The simulation unit 14 uses the vehicle dynamics model 34 to compute a behavior of the mobile unit based on the operation output value (S62). The mobile unit moves to the computed position in accordance with the computed behavior (S64), and the display unit 16 displays a resulted simulation image (S66). Then, in the next time step, these processes are repeated starting from step S52. It should be noted that these computations are performed in parallel for each of the mobile unit models 30.

Figure 3:
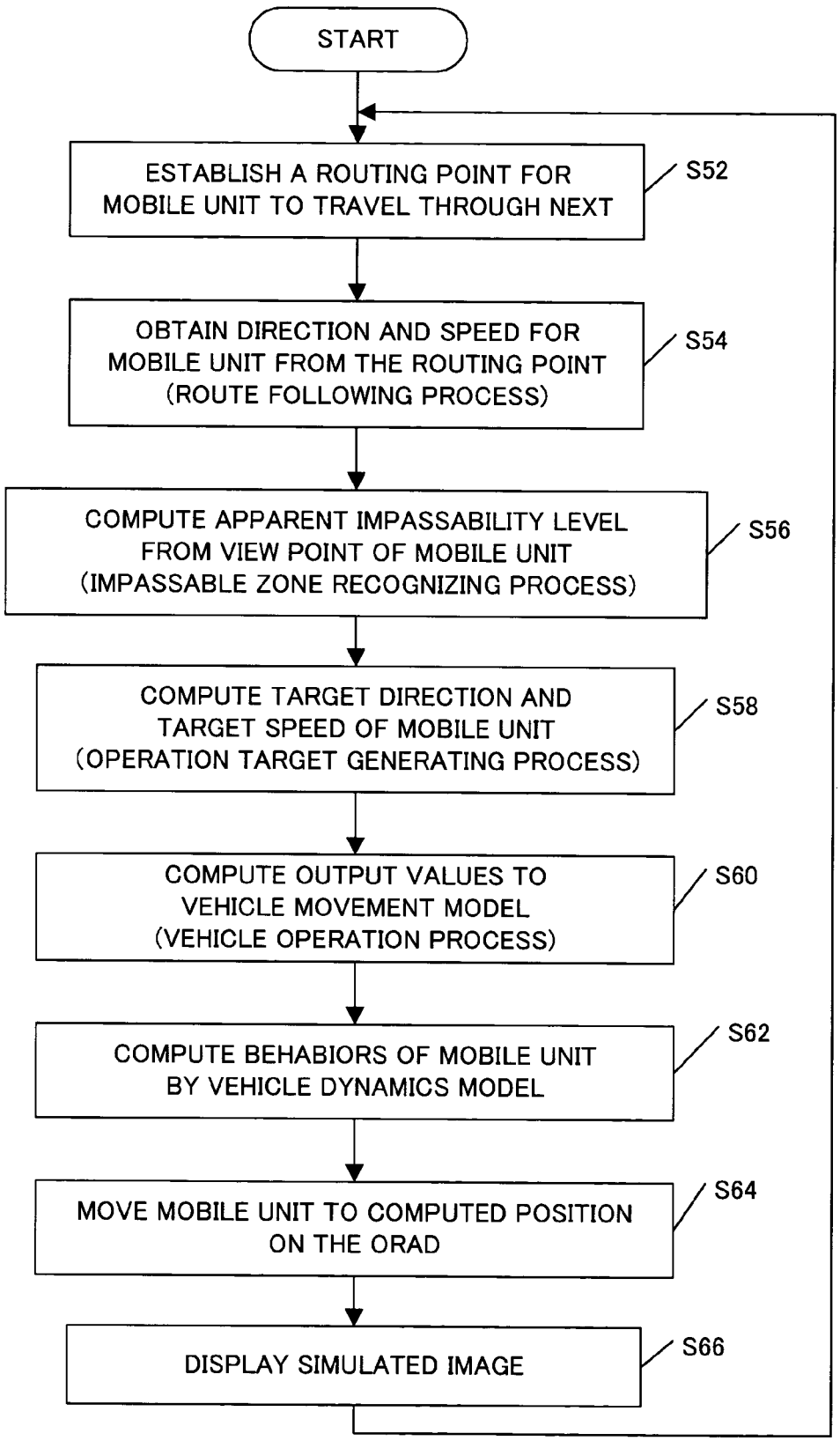
FIG. 3 shows a flowchart of a road traffic simulation process.

In the flowchart of FIG. 3, the sequence of some steps may be alternated. For example, the path tracking process in S54 and the impassable area detecting process in S56 may be either reversed in sequence or performed in parallel.

In the following, the road traffic environment database 20, the driver model 32 and the vehicle dynamics model 34 which are included in the simulation unit 14 will be described.

2. Road Traffic Environment Database

The road traffic environment database 20 includes passable zone data 22 which are information for allowing mobile units to travel in the road traffic environment. The database 20 also includes impassable zone data 24 which are information for disabling or restricting mobile units to travel due to certain factors. The database 20 further includes road facilities status data 26 in which multiple patterns are provided for various operating status of traffic regulations and/or the road facilities. The road database 20 further includes map data (not shown) regarding the locations/shapes of the roads and/or the buildings and/or such traffic facilities as central road-dividing zones and/or traffic lights. The map data are information for creating the road traffic environment that is displayed with the display unit 16. Additionally, the database 20 may include such information as weather conditions and/or possible changes of road surfaces in accordance with the weather conditions.

Figure 4:
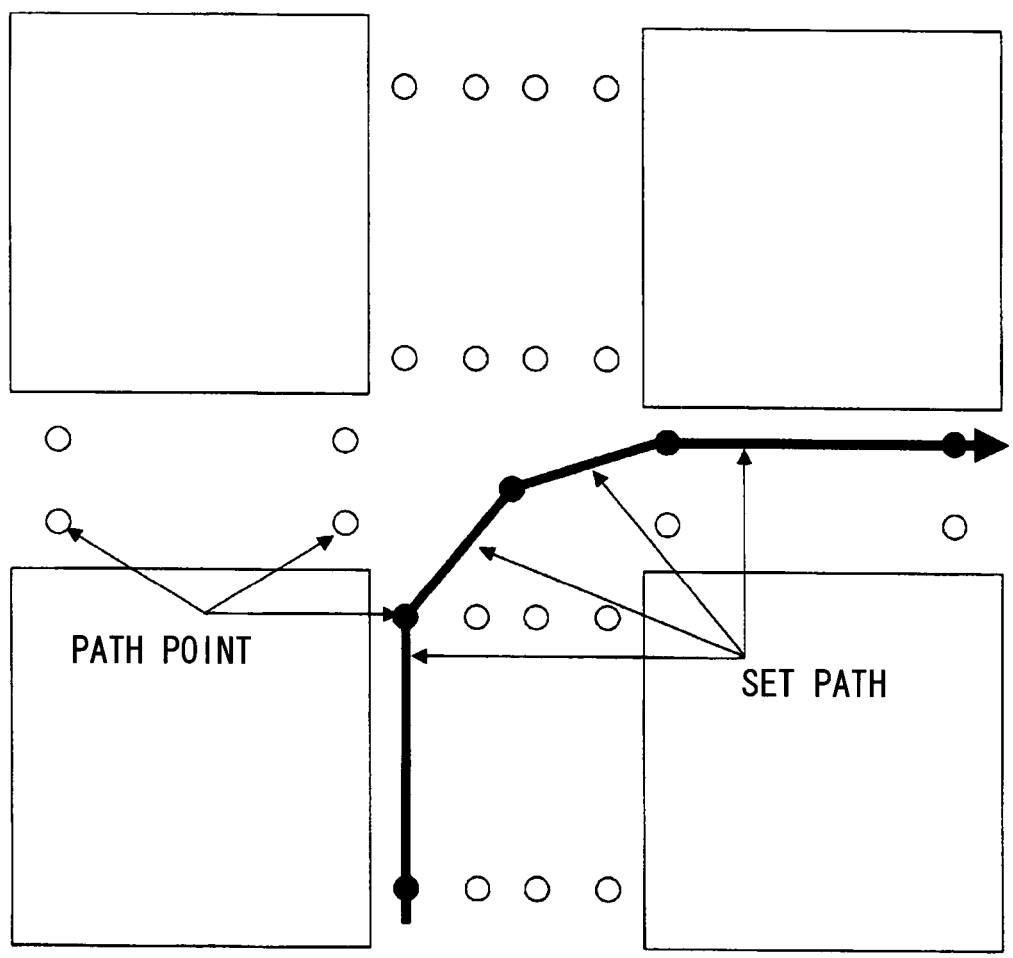
FIG. 4 is a diagram of a passable zone in the road traffic environment database.

The passable zone data 22 are two-dimensional map data including path points indicating the areas where mobile units are allowed to travel through. The term of "path point" means a point located in such a passable zone as a driving lane and a road crossing through which mobile units can travel. Those path points are set up, for example, as illustrated in FIG. 4. FIG. 4 shows a crossing where two roads cross, one being a vertically-extending road having two driving lanes each in opposite directions and the other being a horizontally-extending road having one driving lane each in opposite directions. Each of the four corners of the crossing is an impassable zone. Some path points are set up with an appropriate interval along the lane. Besides, some other path points are set up at the center of the crossing as well as at the entering portions of the crossing. A path for each mobile unit is established by serially connecting these path points. The example shown in FIG. 4 represents one path for a mobile unit turning to the right at the crossing. Any path for various mobile units can be easily established by setting the path points.

In a conventional simulator, a mobile unit basically follows the path. However, according to the present invention, the mobile unit needs not necessarily follow these paths. This will be described later with reference to several exemplary embodiments. It should be noted that these passable zone data do not include such information as speed limit for each road. This point will be also described later.

In this specification, the term of "path" is used to indicate a destination that is set up for each mobile unit and the term of "track" is used to indicate an actual path along which each mobile unit actually travels as a result of the simulation computation.

The impassable zone data 24 are two-dimensional map data representing two types of areas. One type represents an impassable area where mobile units cannot pass through. For example, an out-of-road zone such as building, walkway and a central road-dividing zone is included in the impassable area. The other type is a travel restricting area where movement of mobile vehicles is restricted (in other words, mobile vehicles do not necessarily pass through this area unless particularly needed). For example, a lane-dividing line is included in the travel restricting area. In this embodiment, an impassable zone is defined by a "impassability level" which is a numerical value indicating a level of difficulty in traveling.

The road facilities status data 26 are provided with a plurality of patterns of the data regarding various operating status for traffic regulations and/or road facilities. In this embodiment, the operating status for the traffic regulations refer to, for example, conditions of time-dependent regulations such as no passing or no lane-changing which may be set variably according to the time zone. The operating status for road facilities refers to, for example, conditions of traffic lights which are periodically switched in a given timing. Any of these operating condition patterns may be changed with another operating condition pattern in an appropriate timing. These operating condition patterns are also used to calculate "impassability level from driver's views" which will be described hereafter.

Figure 5:
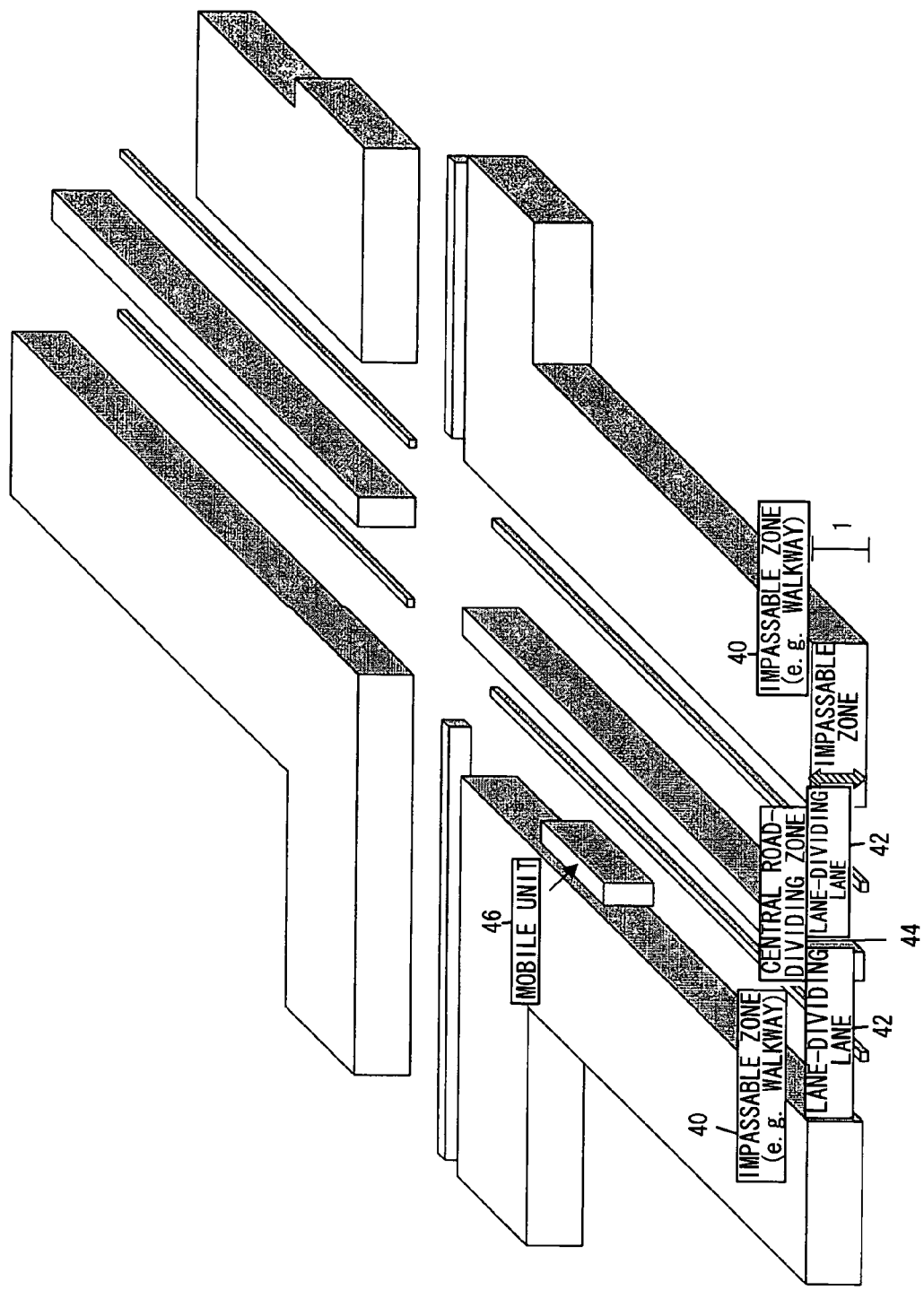
FIG. 5 is a diagram of an impassable zone in the road traffic environment database.

FIG. 5 conceptually shows the same crossing as shown in FIG. 4 from the viewpoint of impassability levels. In FIG. 5, impassability level of buildings, walkways, road edges etc. (40), impassability level of lane dividing tines (42), impassability level of central road-dividing zones (44) and impassability level of other mobile units (46) are represented by the height of respective areas. Impassability levels are relative values. In the present embodiment, the range for the values is defined to be [0,1]. The impassability levels are set in accordance with possibility for mobile units to enter and with traffic regulations. As can be seen in FIG. 5, the areas where mobile units cannot travel (for example, walkways and buildings 40) are given the impassability level of the maximum value "1". Similarly, central road-dividing zones and/or the other mobile units 46 are also given "1". As for the two-lane road extending in the diagonal direction in FIG. 5, the lane-dividing lines in this example are given the impassability level of 0.1 because mobile units need not pass through the lane-dividing line unless there is a special need such as for avoiding an obstacle ahead in the lane. As for the single-lane road extending in the left and right direction in FIG. 5, the center line is given the impassability level of 0.3, which is larger than that of the above-described lane-dividing lines, because lane-change is not expected. Need there is for mobile units to go over the center line to pass another vehicle in the same lane. Thus, it should be noted that a magnitude of the impassability level is not related with a size of a building or a traffic facility which may be seen by a virtual driver who travels through the road traffic environment.

The impassability level used in the present embodiment is characterized in that it can represent not only the impassable zones but also traffic regulations in relation with such traffic facilities as traffic lights and crossings. As for a traffic light as an example, it is possible to control mobile units indirectly to travel through the traffic light by giving "1" to the red traffic light, "0" to the blue and "0.3" to the yellow respectively as its impassability level. Further, other mobile units which autonomously travel through the road traffic environment can be represented by respective impassability levels.

Besides, as will be understood, the values of impassability levels can be appropriately changed in accordance with the characteristics of the simulated roads and/or traffic regulations.

As to be described later, each driver model determines the direction and/or the speed of its own mobile unit depending on the magnitude of the impassability level. Accordingly, by introducing such impassability level, it is possible to uniformly manage all of the road shapes, the traffic regulations, existence of other mobile units and so on.

In the road environment database used with the conventional micro traffic simulation, there are some items which cannot be generated as attribute values from the underlying maps, for example, average speed of free travel in each lane and tracks that mobile units should follow. For this reason, according to the conventional approaches, a long time is required to generate such data. In contrast, the road traffic environment database according to the present invention converts roads, buildings, traffic facilities and the like into respective impassability levels so that passable zones and impassable zones are automatically generated from publicly-available digital maps. Thus, the area to be covered by the traffic simulation can be easily expanded.

Besides, contour lines of the impassable zones may be divided into edge lines, which may be used as impassable lines.

3. Driver Model

The driver model 32 determines operation values such as an operation angle for the steering wheel and control value for a braking pedal and an accelerator pedal responsive to information from the road traffic environment database 20 and traffic conditions of other mobile unit models. It outputs the determined values to the vehicle dynamics model 34. Now, referring to FIG. 6 through FIG. 13, the configuration of the driver model 32 and the processes to be performed will be described.

Figure 6:
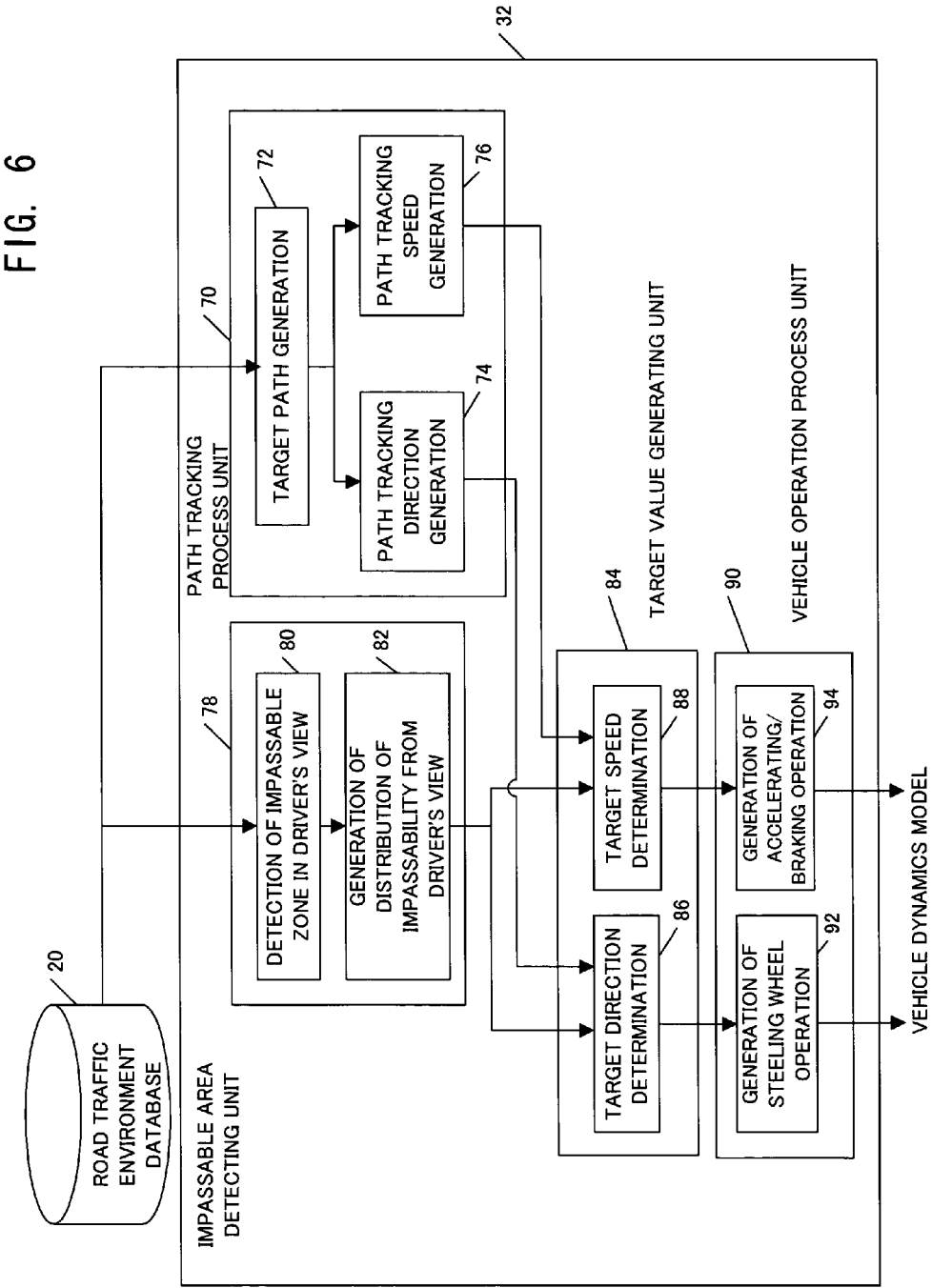
FIG. 6 shows a flowchart of a process in the driver model.

FIG. 6 shows a functional block diagram of the driver model 32. The driver model 32 includes a path tracking process unit 70, an impassable area detecting unit 78, an target value generating unit 84 and a vehicle operation process unit 90. The path tracking unit 70 computes a path which the mobile unit should take to follow a path that is set based on the data on passable zone obtained from the traffic environment database 20. The impassable area detecting unit 78 generates a distribution of impassability level from driver's views in which impassability levels for the impassable zones and other mobile units are converted into a vision that is viewed from the subject mobile unit. Based on the computation results in the process units 70 and 78, the target value generating unit 84 obtains direction and speed with which the mobile unit actually travels. The vehicle operation unit 90 converts the output of the unit 84 into vehicle operation values to be provided to the vehicle dynamics model. In FIG. 6, respective processes to be performed within each functional unit are also shown. Each functional block will be described in the following.

3.1. Path Tracking Process Unit

The path tracking process unit 70 dynamically generates a tracking path that the mobile unit should take based on a set path for each mobile unit. The set path for each mobile unit may be either predetermined or it may be established such that the mobile unit travels at random in the road traffic environment.

A target path generating unit 72 provides each mobile unit with an initial point of the set path as an initial position of the mobile unit at the simulation starting time. It also provides for each step of simulation a next path point to subsequently travel (target path point), so that a target path can be established. The target path generating unit 72 updates the target path point and establishes the next path point as a new target path point when the mobile unit approaches the target path point as the simulation proceeds until the distance from the target path point becomes lower than a threshold value for switching path points. The threshold value is predetermined for each driver model.

Based on the output from the unit 72, a path tracking direction generation unit 74 obtains a path tracking direction $\Psi_f$ to be output to the target value generating unit 84.

Figure 7:
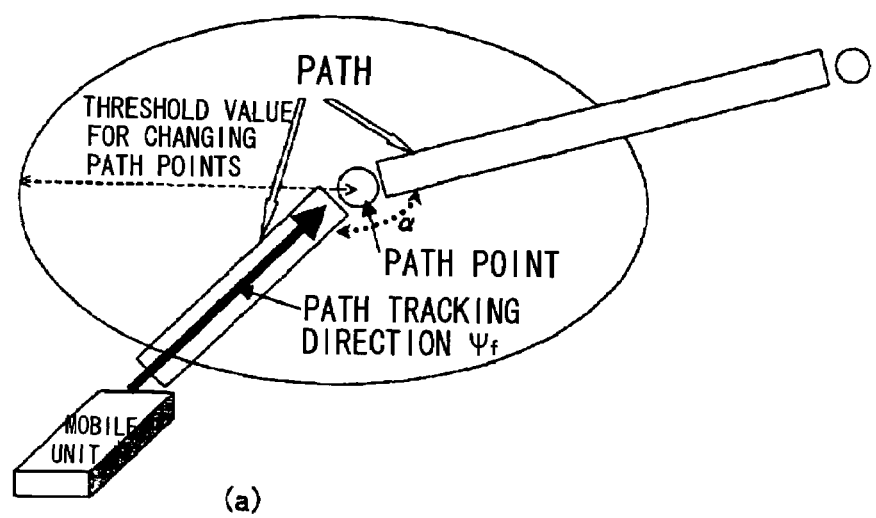
FIG. 7 illustrates a process of generating a path tracking direction.
Figure 7:
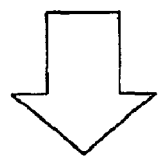
Figure 7:
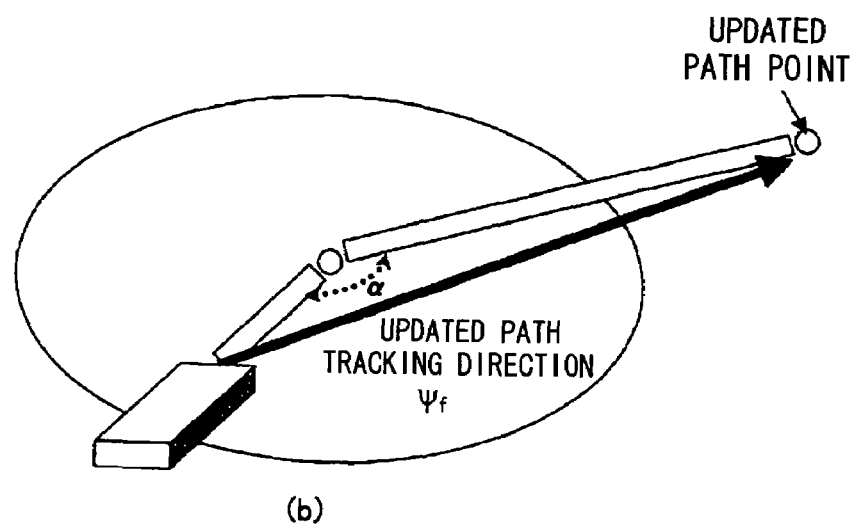

FIG. 7 shows how a path tracking direction is generated. At first, the distance between the mobile unit and the target path point is larger than the predetermined threshold value for changing path points, as shown in (a) of FIG. 7. The direction of movement of the mobile unit toward the target path point is a path tracking direction $\Psi_f$. As the mobile unit moves toward the path point, the distance from the mobile unit to the target path point becomes smaller than the predetermined threshold value as shown in (b) of FIG. 7. If so, the target path point is updated to the next path point by the unit 72. Accordingly, the direction generating unit 74 takes a new path tracking direction $\Psi_f$, the direction of movement of the mobile unit toward the updated target path point.

Figure 8:
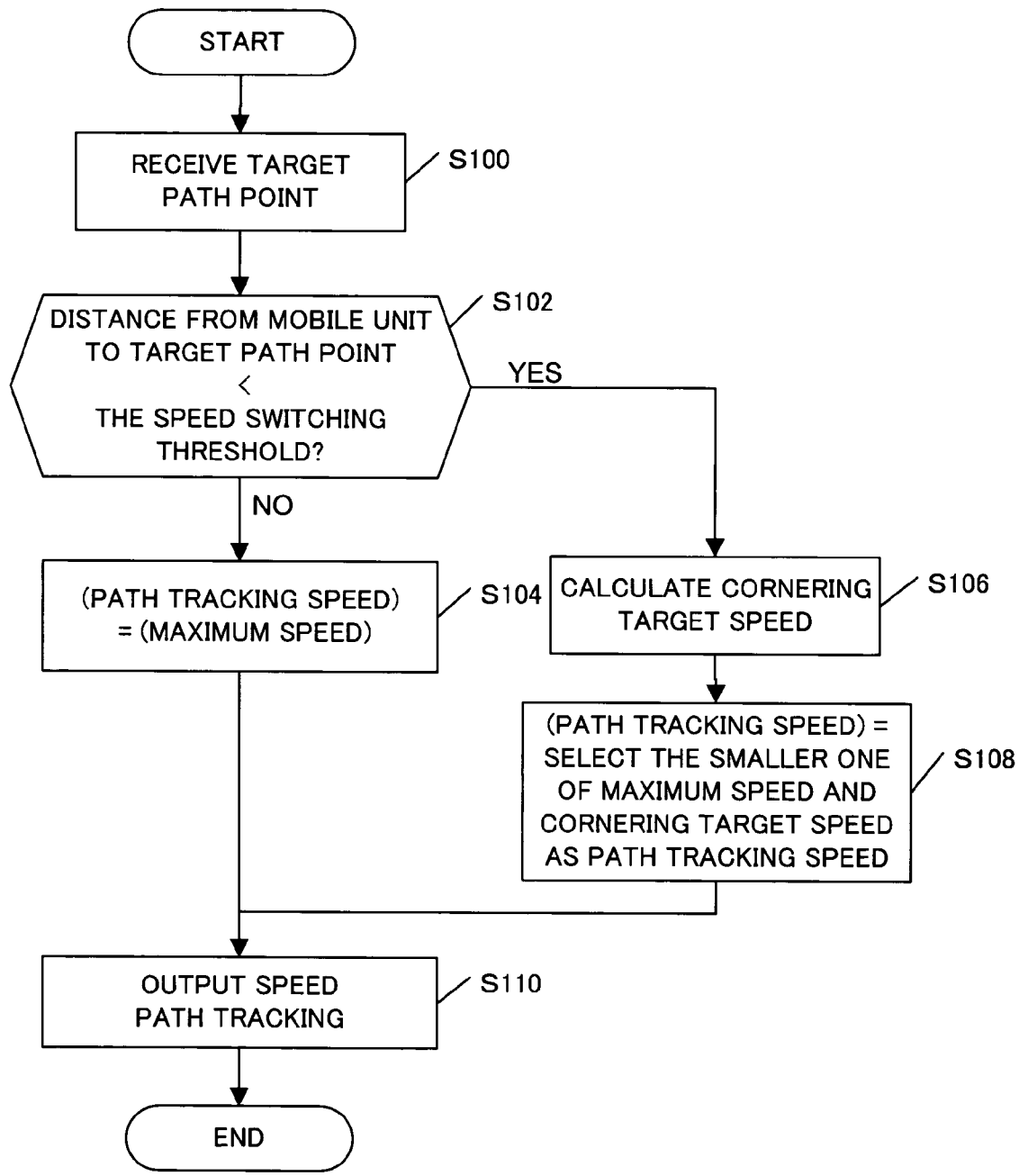
FIG. 8 shows a flowchart of a process of generating a path tracking speed.

A path tracking speed generating unit 76 determines a path tracking speed for each mobile unit to be output to the target value generating unit 84. FIG. 8 shows a flowchart of a path tracking speed generating process.

The speed generating unit 76 receives the next target path point for the mobile unit from the path generating unit 72 (S100). Then, the unit 76 determines a distance between the mobile unit and the target path point and compares the determined distance with a speed switching threshold value $l_c$ that is predetermined for each driver model (S102). The threshold value $l_c$ indicates a distance at which the mobile unit starts to decelerate its speed to turn at a corner. When the distance from the target path point exceeds the threshold value $l_c$, the path tracking speed is set to a maximum speed $v_{max}$ that is set for each driver model (S104). When the distance between the mobile unit and the target path point is smaller than the speed switching threshold value $l_c$, a cornering target speed $v_c$ is computed in order to prevent an excessive outward movement causing the mobile unit to move out of the path around the target path point (S106).

The cornering target speed $v_c$ is calculated in accordance with the characteristic of each driver model and an angle formed by the set path at the target path point. As the angle is larger, the speed becomes larger. It is calculated according to the following equation for example.

$$v_c = \sqrt{\frac{a_y l_c}{\tan(\frac{\pi \cdot \alpha}{2})}}$$

In the above equation, $a_y$ represents a lateral maximum acceleration speed that is set for each driver model, and $\alpha$ indicates an angle that is formed by the set path at the path point (see FIG. 7, $0 \leq \alpha \leq \pi$).

Smaller one of the cornering target speed $v_c$ and the maximum speed $v_{max}$ is selected as a path tracking speed $v_f$, which is input to the target value generating unit 84 (S110). The path tracking speed $v_f$ can be represented as in the following equation.

$$v_f = \min(v_c, v_{max})$$

Through the above-described path tracking process, the driver model 32 determines its own direction to move and its own speed to keep as if a driver in the real world would perform.

3.2. Impassable Area Detecting Process Unit

The impassable area detecting process unit 78 (FIG. 6) extracts impassable zones located within a given range from the mobile unit as a reference so as to generate a distribution of impassability level from driver's views based on the extracted impassable zones.

Figure 9:
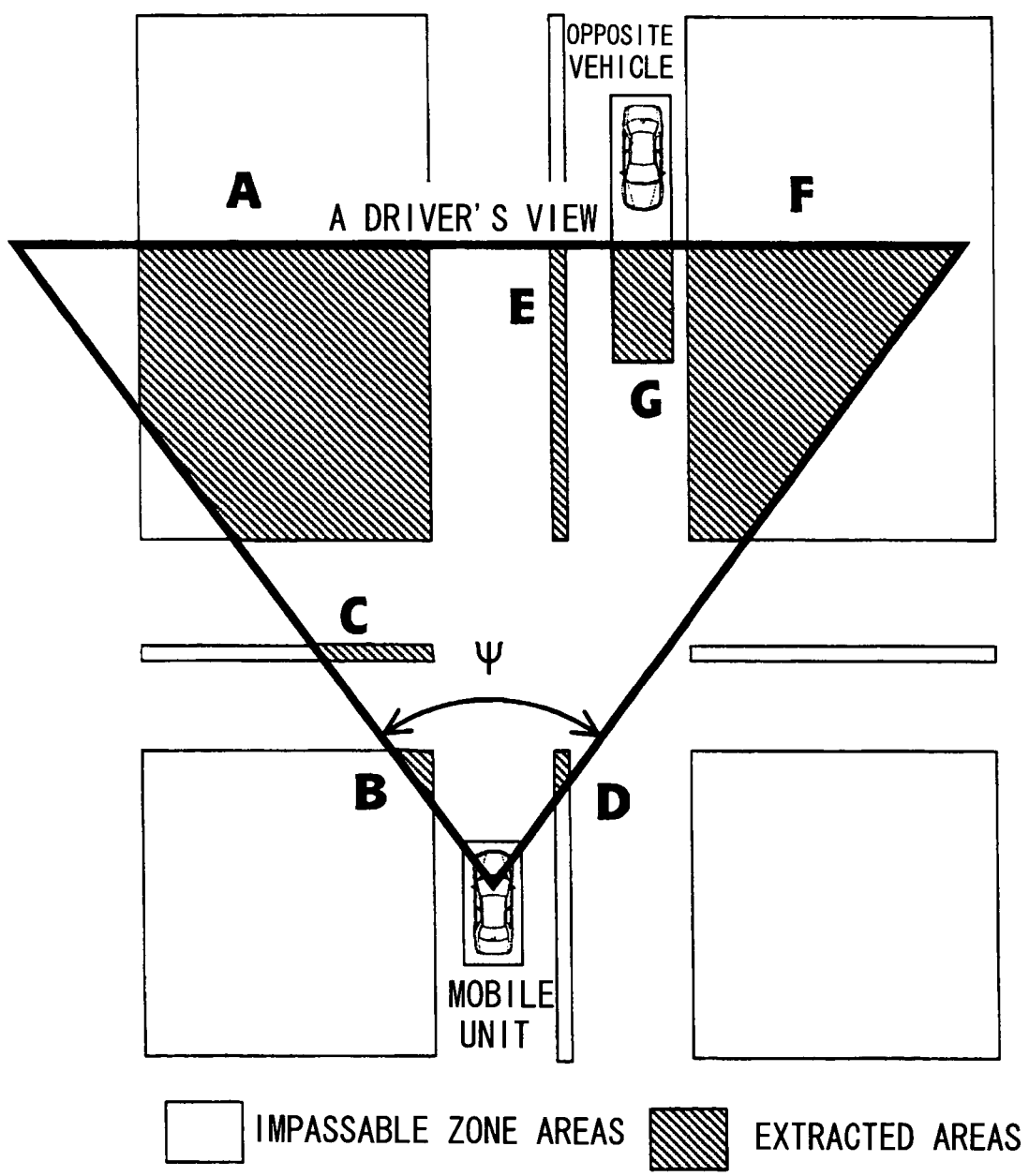
FIG. 9 shows an example of extraction of impassable zones in a driver's view.

A unit 80 for extracting impassable zone in driver's view extracts, in the current time step, impassable zones which are located within a driver's view, a field of an isosceles triangle with the mobile unit at its vertex having a predetermined angle. FIG. 9 shows an example of extraction of impassable zones in a driver's view. In FIG. 9, the areas having the hatch lines indicate the extracted areas, including A, B, F (out-of-road areas), C (a center line), D, E (center line) and G (a mobile unit). As for other mobile units than the subject mobile unit, in this example, a range which each of the other mobile units may move in a given time period is estimated based on the position and speed of the other mobile unit determined through data exchange among the mobile unit models. An area in this range is regarded as an impassable zone (its impassability level is "1"). Therefore, as shown by "G" in FIG. 9, such impassable zone extends ahead of the actual mobile unit.

FIG. 9 shows a situation when the traffic light at the crossing is blue (or green). When the traffic light is red, an impassable zone appears in front of the subject mobile unit at the crossing. These impassable zones are produced based on the operation patterns included in the traffic facility operating condition data 26.

The size of the estimated moving area of another mobile unit may vary depending on a driver's model. The driver's view is not limited to such triangle as described above. It may be a trapezoid or a sector.

Extraction of the impassable zone in driver's view is performed to graphically extract an area that a driver would capture in the real world.

The unit 82 for producing a distribution of an impassability level from driver's view determines a distribution of impassability level from driver's views from the impassable zones extracted by the unit 80 and sends it to the target value generating unit 84. The distribution of impassability level from driver's views indicates respective "apparent" impassability level for each direction $\Psi$ in the driver's view of the driver model. In other words, it is a numerical value indicating how much the operation of the driver model is influenced by the impassable zone that is "seen" from the driver model when the driver model determines the moving direction of the subject mobile unit operated by the driver model.

Accordingly, an impassability level from driver's view for each impassable zone extracted in each direction $\Psi$ is established such that it increases in proportion to the significance of the impassability level that is originally set for each impassable zone, and it decreases in proportion to the magnitude of the distance of the impassable zone from the mobile unit. For example, an impassability level from driver's view d ($\Psi$) is calculated in accordance with the following equation:

$$d(\Psi) = \max_i \frac{D_i(\Psi)}{l_i(\Psi)}$$

In the above equation, $D_i(\Psi)$ represents a level of apparent impassability in the i-th impassable zone detected in the direction $\Psi$, and $l_i(\Psi)$ represents a distance from the mobile unit to the i-th impassable zone detected in the direction $\Psi$.

Figure 10:
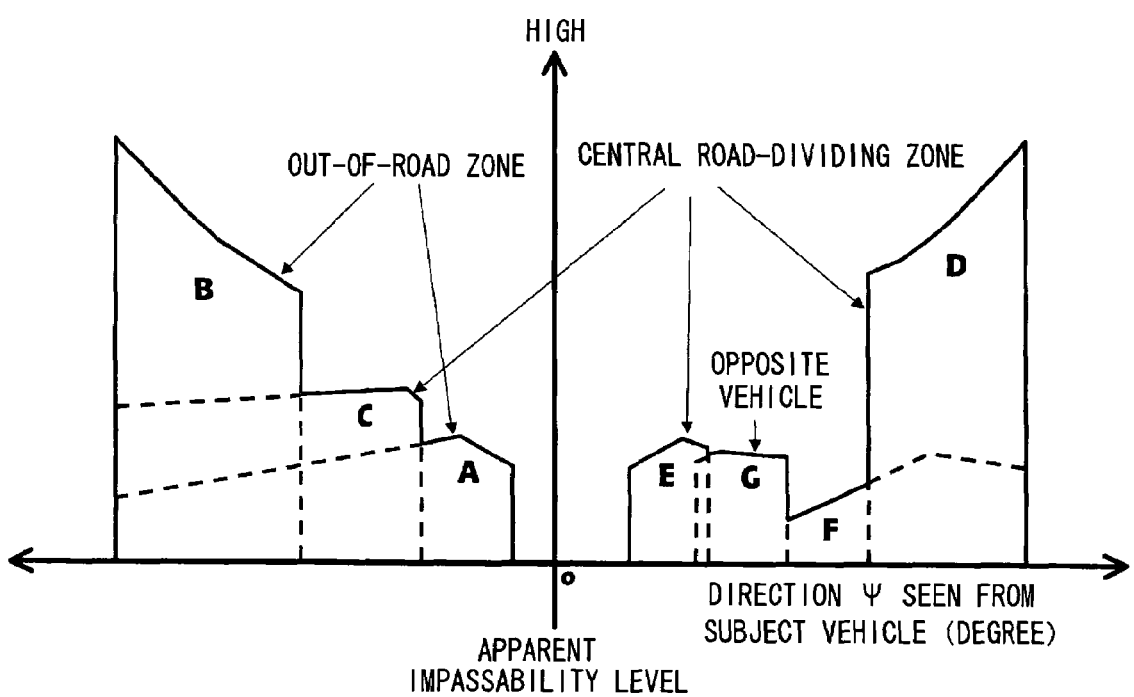
FIG. 10 shows an example of a distribution of impassability level from driver's views.

FIG. 10 schematically shows a typical distribution of impassability level from driver's views d($\Psi$) which are calculated as described above. The horizontal axis represents a direction $\Psi$ seen from the mobile unit and the vertical axis represents an impassability level from driver's view d ($\Psi$). In FIG. 10, reference codes A through G correspond to the impassable zones A through G extracted in FIG. 9 respectively. Referring to FIG. 9 and FIG. 10, the original impassability levels for the areas B, D are set to "1" which is the same as for the areas A and F. The calculated impassability level from driver's view for areas B and D are larger than the areas A and F because areas B and D are located relatively near the mobile unit. Although mobile units cannot actually travel through the areas A, E and F, the mobile units may move toward those areas because those areas are relatively far from the mobile unit. In contrast, because the distance between the mobile unit and the areas B, D is short, the mobile unit will crash or contact those areas if the mobile unit moves toward those areas. By assigning appropriate threshold values to the impassability level from driver's view this way, it is possible to automatically decide the direction of the movement of the mobile unit.

Besides, as for a traffic light or the like, the impassability level from driver's view is calculated as a larger value when the traffic light located immediately in front of the mobile unit is red. However, the calculated impassability level from driver's view is smaller when the traffic light is far from the mobile unit. In this situation, the impassability level gradually increases as the mobile unit approaches the red light.

Such calculated impassability level from driver's view d ($\Psi$) represent a numerical distribution in which information about the nature of the extracted areas (for example, whether or not the area is a real building out of the road or a traffic regulation like a light) is hidden. Thus, both the impassable zones and the various traffic regulations can be represented with one index.

3.3 Target Value Generating Unit

The target value generating unit 84 (FIG. 6) determines a target direction and a target speed for the mobile unit based on the path tracking direction and speed determined by the process unit 70 and the distribution of impassability levels determined by the process unit 78.

Figure 11:
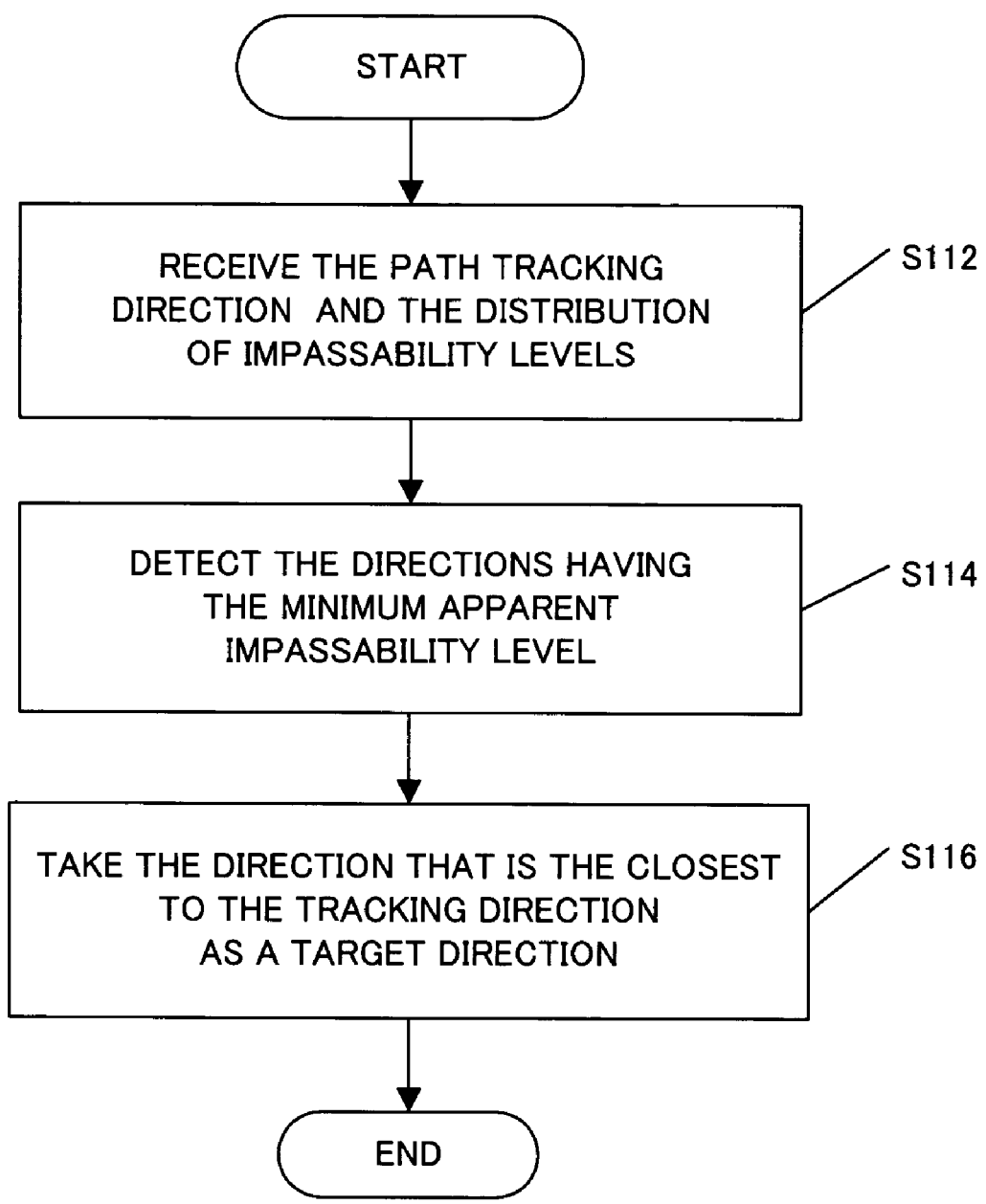
FIG. 11 shows a flowchart of a process of determining a target direction.

FIG. 11 is a flowchart of a target direction determining process. A target direction determining unit 86 receives the path tracking direction ($\Psi$) that is output by the direction generating unit 74 and the impassability level from driver's view distribution d$\Psi$ that is output by the distribution generating unit 82 (S112). Next, the unit 86 looks into the impassability level from driver's view $\Psi_f$ to detect directions having the minimum impassability level from driver's view (S114). When there are a plurality of directions having the minimum impassability level, the direction which is closest to the path tracking direction $\Psi_f$ is selected as a target direction $\Psi_t$ (S116).

Figure 12:
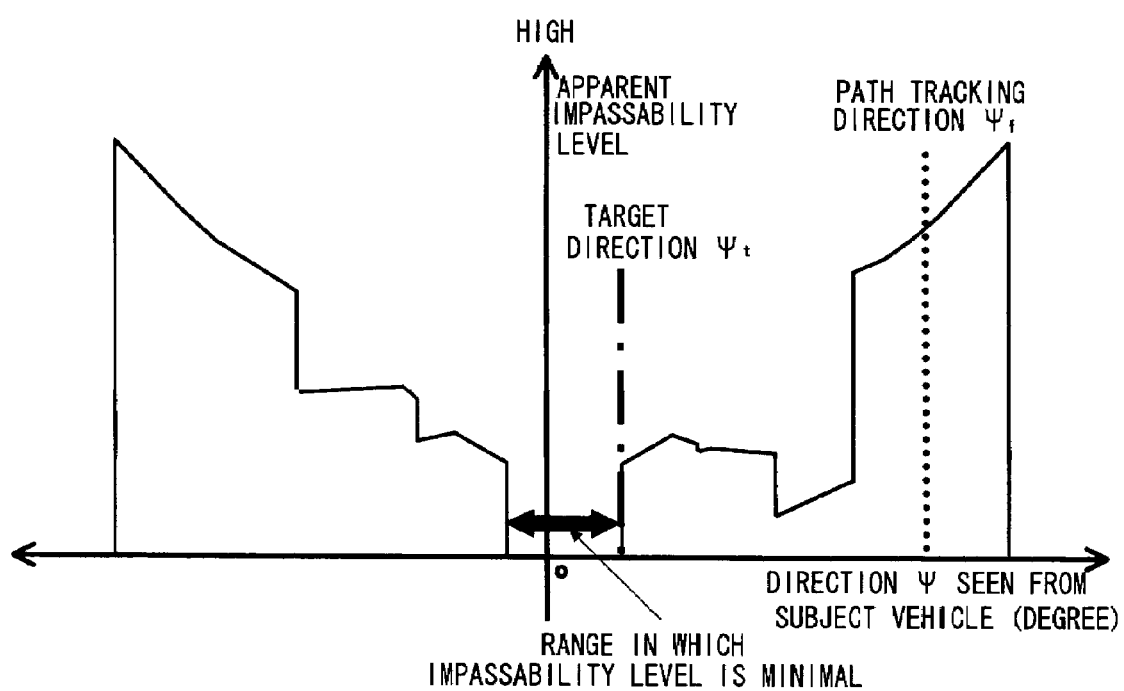
FIG. 12 illustrates how a target direction is determined.

FIG. 12 shows how the target direction is determined according to the above-described process. The distribution d ($\Psi$) of impassability level from driver's views is the same as that shown in FIG. 10. In this example, the unit 86 selects as a target direction $\Psi_t$ the direction which is closest to the path tracking direction $\Psi_f$ within the range (shown by an arrow in the center of FIG. 12) where the impassability level from driver's view are minimal (S116). In this regard, it is possible to stop the mobile unit at a certain time, for example, when the traffic light is red, by setting an appropriate threshold value so as to disable selection of the target direction $\Psi_t$ when the minimum impassability level from driver's view exceeds the threshold value.

The determined target direction $\Psi_t$ is output to the vehicle operation process unit 90.

Figure 13:
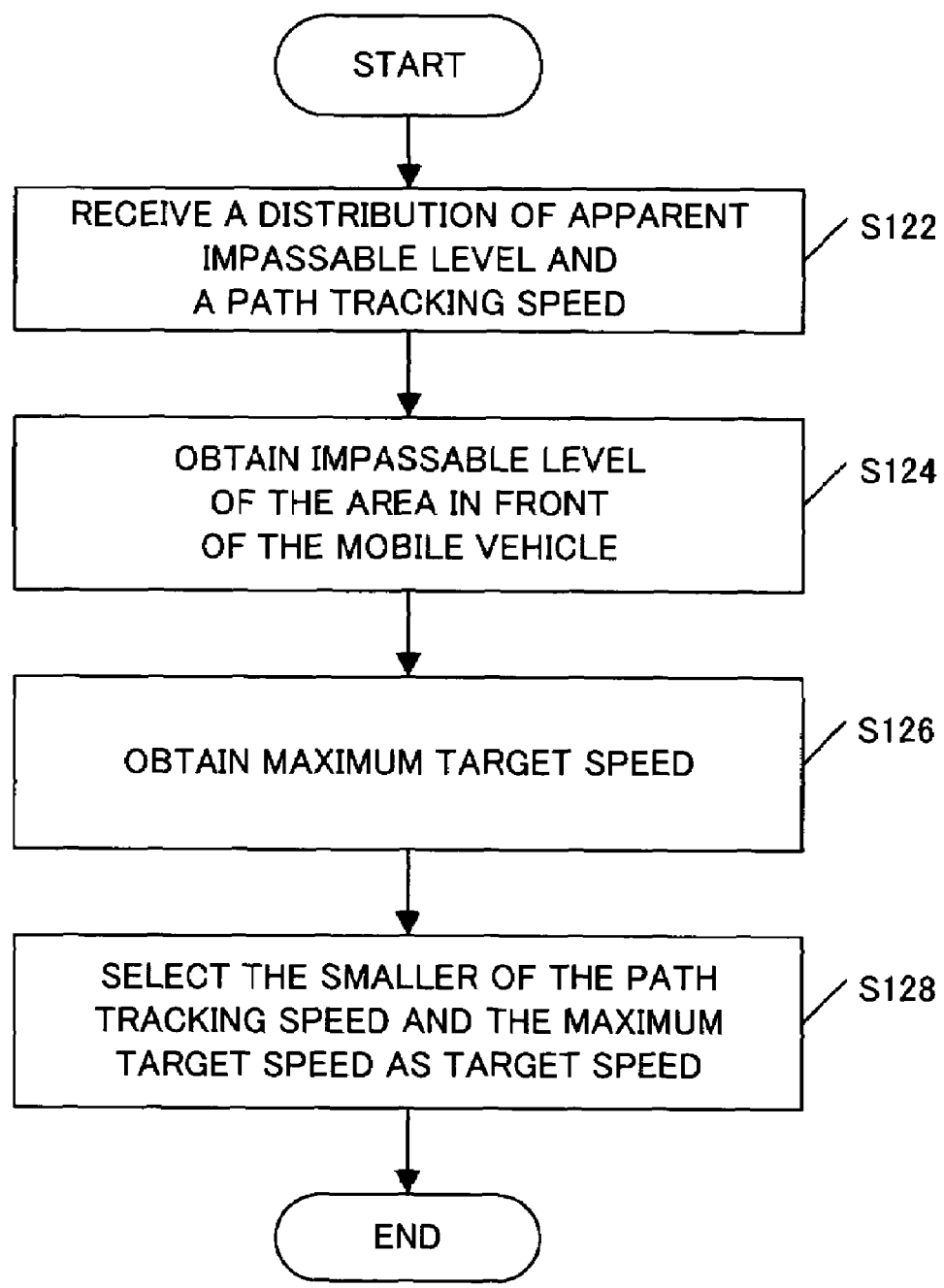
FIG. 13 shows a flowchart of a process of determining a target speed.

FIG. 13 is a flowchart of a target speed determination process. A target speed determining unit 88 receives the path tracking speed $v_f$ and the impassability level from driver's view distribution d($\Psi$) (S122). The unit 88 determines an impassability level from driver's view in front of the mobile unit (at the origin in the example of FIG. 12) from the impassability level from driver's view distribution d($\Psi$) (S124). The unit 88 calculates a maximum target speed $v_d$ based on the determined degree (S126). The maximum target speed is established such that it becomes smaller or zero as the impassability level from driver's view is higher. For example, it is calculated according to the following equation:

$$V_d = \sqrt{\frac{a_x}{d}}$$

In the above equation, $\alpha_x$ represents a maximum acceleration speed in the longitudinal direction at the time of the deceleration, which is set up for each driver model. d represents an impassability level from driver's view in front of the mobile unit.

By comparing the maximum target speed $v_d$ and the path tracking target speed $v_f$, smaller one is selected as a target speed $v_T$ as shown in the following equation (S128).

$$v_T = \min(v_d, v_f)$$

The determined target speed $v_T$ is output to the vehicle operation process unit 90.

Through the above-described target value generation, the mobile unit can get out of the way of other mobile units and/or the out-of-road zones while keeping on the lane of the set path.

3.4 Vehicle Operation Process Unit

The vehicle operation process unit 90 determines an operation output to be provided from the driver model to the vehicle dynamics model based on the target direction $\Psi_t$ and the target speed $v_T$ determined by the process unit 84.

A steering wheel operation generating unit 92 converts the target direction $\Psi_t$ into the steering wheel operation angle to be given to the vehicle dynamics model. This conversion is performed, for example, according to the following steps:

First, a temporary target steering wheel angle $s_{Tmp}$ is determined by multiplying the target direction $\Psi_t$ by a steering gain $g_s$. Next, a limiting process upon the obtained $s_{Tmp}$ is performed using an operation range $[-s_{max}$ and $s_{max}]$ for the steering wheel which is set up for each vehicle dynamics model, to calculate a target steering wheel angle $s_T$.

The difference between the calculated target steering wheel angle $s_T$ and the current steering wheel angle $s_{k-1}$ is calculated. The calculated difference is multiplied by a predetermined time-lag gain $g_s^d$ ($0 \leq g_s^d \leq 1$), so as to produce a $\Delta s$. These calculations can be expressed as follows:

$$\Delta s = g_s^d (s_T - s_{k-1})$$

$$s_k = s_{k-1} + \Delta s$$

An accelerating/braking operation generating unit 94 converts the target speed $v_T$ into an accelerating amount and a braking amount to be given to the vehicle dynamics model. This conversion is performed, for example, according to the following steps:

At first, a temporary target accelerator pedal depressing amount $a_{Tmp}$ and a temporary target braking pedal depressing amount $b_{Tmp}$ are obtained by multiplying a difference between the target speed and the actual speed v by a predetermined accelerating gain $g_a$ and a predetermined braking gain $g_b$ respectively. Next, limiting processes upon the $a_{Tmp}$ and the $b_{Tmp}$ are performed respectively using an operation range $[a_{min}, a_{max}]$ or $[b_{min}, b_{max}]$ for the accelerating and the braking operations which are set up for each vehicle dynamics model, so as to calculate a target accelerator pedal depressing amount $a_T$ and a target braking pedal depressing amount $b_T$ respectively.

Then, respective differences between the calculated target accelerator pedal depressing amount $a_T$ or the determined target braking pedal depressing amount $b_T$ and the current accelerating control input $a_{k-1}$ or the current braking control input $b_{k-1}$ are calculated respectively. The differences are multiplied respectively by a predetermined time-lag gain $g_a^d$ ($0 \leq g_a^d \leq 1$) or $g_b^d$ ($0 \leq g_b^d \leq 1$) so as to calculate a $\Delta a$ and a $\Delta b$. Then, $a_{k-1}$ and $b_{k-1}$ are added to $\Delta a$ and $\Delta b$ respectively, so that the accelerator pedal operation value and the braking pedal operation value are determined. These processes can be expressed as follows:

$$\Delta a = g_a^d (a_T - a_{k-1})$$

$$a_k = a_{k-1} + \Delta a$$

$$\Delta b = g_b^d (b_T - b_{k-1})$$

$$b_k = b_{k-1} + \Delta b$$

Such calculated steering wheel operation angle, accelerating operation value and braking operation value are provided to the vehicle dynamics model.

It should be noted that such values as steering gain, accelerating gain and braking and/or each of time-lag gains may be determined as unique values for each driver model in order to represent the personality of the driver.

4. Vehicle Dynamics Model

The vehicle dynamics model receives the operation inputs (steering wheel operation angle, accelerating/braking operation values) which are output from the driver model and it also determines information such as the road conditions from the road environment database. Based on these received inputs and the obtained information, the vehicle dynamics model computes the behavior of the mobile unit. Based on the behavior, a position of the mobile unit in the current time step is computed and displayed in the display unit 16.

The vehicle dynamics model has a high freedom which is equivalent to that used in conventional driving simulators. The model is expressed by the position and the Eulerian angle of the vehicle in a coordinate system. Since such vehicle dynamics model itself is well known in this technology field (for example, as described in the above-referenced KOKAI H11-No.272158), detailed description about the vehicle dynamics model is omitted in this specification.

In the present invention, each mobile unit is provided with a respective vehicle dynamics model. Through provision of the vehicle dynamics model, it is possible to simulate such factors as the disturbance related with road surface (for example, a slip over the frozen road surface) and/or the disturbance related with the vehicle body (for example, the deflection of the vehicle body at the time of straight-ahead move), so that a speed adjustment can be carried out in accordance with the road conditions.

Accordingly, each mobile unit can travel through the roads freely with no restriction regarding the track that is usually pre-established in conventional macro traffic simulators. Besides, by changing the vehicle dynamics model, it is possible to simulate different vehicles such as two-wheeled or four-wheeled vehicle etc. and/or different vehicle types such as dumping truck, truck, sedan and so on. Furthermore, by tuning up the wheel movement model, it is possible to express the differences of the detailed behaviors among such vehicles as sport car, RV car and wagon car and so on.

5. Exemplary Embodiments

As described above, in the nano traffic simulator according to the present invention, a mobile unit is divided into a driver model and a vehicle dynamics model. The driver model autonomously generates an operation input to the corresponding vehicle dynamics model in accordance with traffic conditions that the subject mobile unit encounters. On the other hand, the vehicle dynamics model receives the output from the driver model and various road environment parameters so as to output vehicle behaviors as a result of its simulation process. Thus, according to the nano traffic simulator of the present invention, it is possible to simulate more various mobile behaviors in more details than in conventional macro traffic simulators. In other words, it is possible to realize such natural simulation in which a driver having his or her own personality seems to drive actually such vehicle that follows a law of physics in the real world.

Besides, any arbitrary track may be used in the nano traffic simulator according to the present invention. Thus, although conventional macro traffic simulators impose such limitation that each vehicle needs to travel within a lane in a lengthwise direction of a road and needs to perform a transition interpolation in a crosswise direction, the nano traffic simulator according to the present invention does not need such limitation.

Further, since vehicle dynamics models used for mobile units have an equivalent high freedom as used in the driving simulator, there is no need to try to make a consistency in behavior freedom and no need for data conversion when a vehicle dynamics model is incorporated into the driving simulator.

Many of conventional micro traffic simulators classify behavior patterns of mobile units into various situations which may happen in traffic environments, for example, free traveling, following a preceding vehicle, changing lanes, turning to the right, avoiding another vehicle parking in the road etc., and establish a respective rule or rules to be applied to the behavior of the mobile unit for each situation (for example "stop at a red traffic light when it is located in a certain distance", "move to another lane when there is an obstacle ahead") in order to try to enhance the variety of the situations and the mobile unit behaviors which can be simulated. However, as for one scene such as "parking on the road" for example, it is practically almost impossible to develop all models and all rules applicable to all situations because behaviors for each mobile unit to take to cope with the actual traffic situations vary in accordance of various factors such as road width, size of the parking vehicle, influence by a vehicle on the opposite lane and so on. Therefore, in conventional micro traffic simulators, situations and mobile unit behaviors which can be simulated are limited consequentially.

In contrast, in the nano traffic simulator according to the present invention, mobile units move dynamically based on distributions of the impassability level from driver's views which are generated step by step. Accordingly, there is no need to pre-classify the expected situations to establish travel rules for each situation. These distributions of impassability level from driver's views can be uniformly managed independently of the types of the objects (such as traffic facilities or other vehicles) which may influence the travel of the subject mobile unit. Besides, even when a new traffic regulation such as traffic sign is included on the map, it is possible to easily include it only by determining a value of a impassability level.

Now, referring to exemplary embodiments 1 to 4 as particular traffic conditions, description will follow about what behaviors are output by the nano traffic simulator 10 according to the present invention that has the above-described characteristics.

5.1. Exemplary Embodiment 1—Lane Width and Mobile Unit Speed

Figure 14:
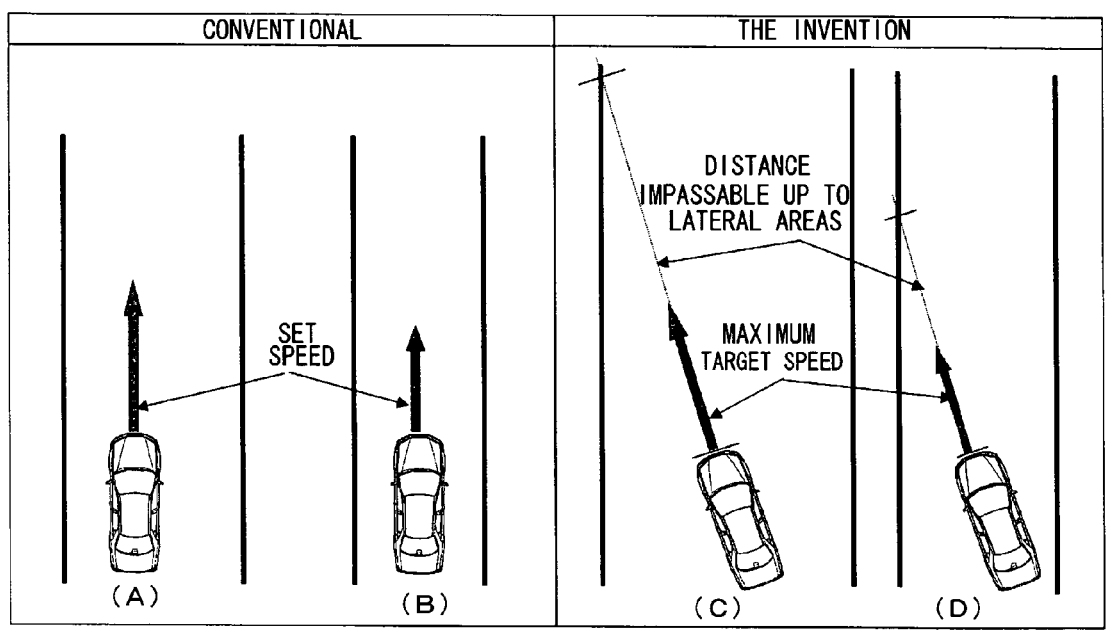
FIG. 14 illustrates the first exemplary embodiment.

FIG. 14 shows an example illustrating a difference between conventional traffic simulators and the nano traffic simulator according to the present invention in terms of influence of a lane width upon a mobile unit speed. In conventional traffic simulators, a speed of a mobile unit is given as an attribute for a lane or as a limited speed for each mobile unit. In the former case, for example, the speed is set to a larger value in proportion to the lane width (in (A) of FIG. 12, the mobile unit speed is set to a relatively large value because the lane width is wider than that shown in (B)). Therefore, the influence of the lane width upon the mobile unit speed is static. In the latter case where a limited speed is given for each mobile unit, the lane width has no influence upon the traveling speed of the mobile unit.

In contrast, in the nano traffic simulator according to the present invention, a maximum speed $v_d$ is determined in accordance with an impassability level from driver's view as shown in the equation (4). Specifically, as seen in (C) and (D) in FIG. 14, the driver model detects a distance from the subject mobile vehicle up to a impassable zone and determines an impassability level from driver's view by dividing the impassability level for that impassable zone by the detected distance. Accordingly, even when the impassability levels are all equal, target speeds in association with those impassable zones become larger in proportion to the square root value of the distance up to the impassable zone. Therefore, as for the impassability level from driver's views of the areas in front of the mobile unit, the level in (C) is lower than that in (D), leading to a higher maximum speed $v_d$ in (C) than in (D). Thus, there is no need to set up a speed for each lane.

Additionally, according to the same consideration, when a impassability level for a lateral impassable zone beside the subject mobile unit is relatively small, the maximum speed $v_d$ becomes relatively large. Besides, when stability of a mobile unit is high for straight travelling, the maximum speed $v_d$ becomes relatively high because fluctuation of the mobile unit to the left and right directions is small, making the influence from the lateral impassable zone small. Thus, according to the present invention, it is possible to simulate how a mobile unit speed is influenced by physical characteristics of the mobile unit and surrounding traffic environments.

5.2. Exemplary Embodiment 2—Action for Avoiding an Obstacle

Figure 15:
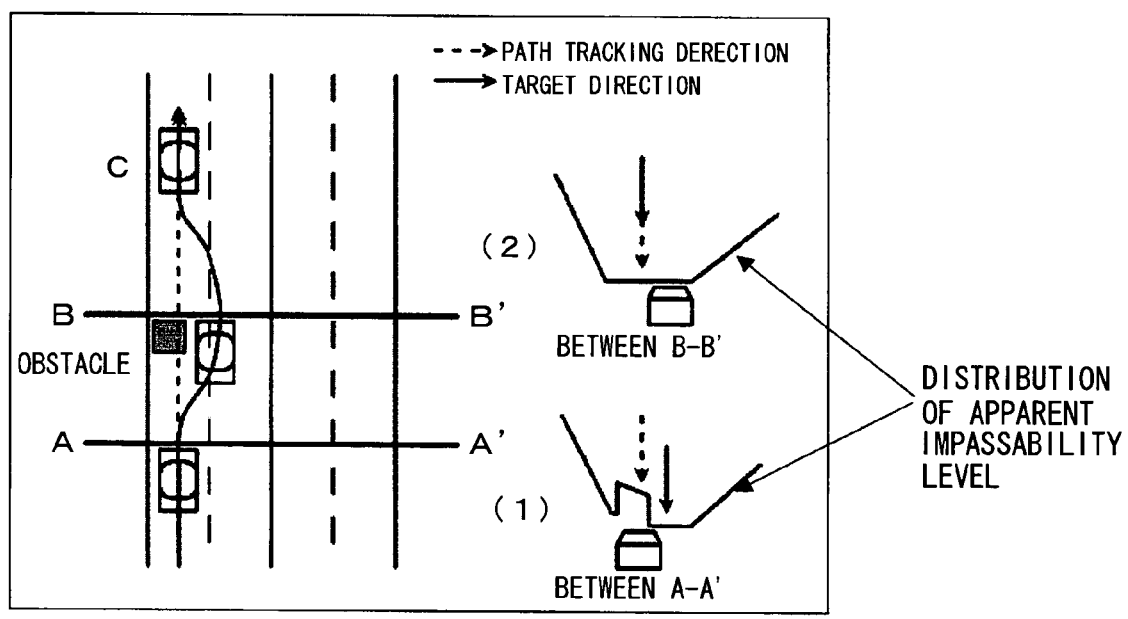
FIG. 15 illustrates the second exemplary embodiment.

FIG. 15 illustrates an action for avoiding an obstacle existing in front of a mobile unit while it is traveling through a two-lane road. The mobile unit may travel through a dotted path in FIG. 15 if there are no obstacles. First, when the mobile unit comes to the A-A' point, the driver model generates an impassability level from driver's view distribution based on the impassable zones including the obstacle and the out-of-road areas. The resulted distribution may be as illustrated in (1) of FIG. 15. In FIG. 15, a dotted arrow indicates a path tracking direction $\Psi_f$ determined by the path tracking direction generating unit. Based on the impassability level from driver's view distribution, the driver model establishes a target direction $\Psi_t$ in the solid-line arrow direction which has the highest impassability and is closest to the path tracking direction $\Psi_f$. By repeating this calculation several time steps, the mobile unit finally reaches the B-B' point of FIG. 15. At this point, the portion corresponding to the obstacle disappears from the impassability level from driver's view distribution for the driver model (see (2) of FIG. 15). Since the driver model sets the path tracking direction $\Psi_f$ to the target direction $\Psi_t$, the traveling direction of the mobile unit gradually changes to return to the original path (shown in a dotted line) along which the mobile unit was running, and the mobile unit returns to the path at a point C.

As described above, the nano traffic simulator according to the present invention does not depend on the roles and/or the attributes of traffic facilities, the other mobile units and/or any other objects that influence the travel of the subject mobile unit but manages those objects by impassability level from driver's view distributions in a uniform manner. Therefore, the nano traffic simulator can simulate various situations without pre-classifying possible situations.

5.3. Exemplary Embodiment 3—Track of Mobile Unit when Avoiding an Obstacle

Figure 16:
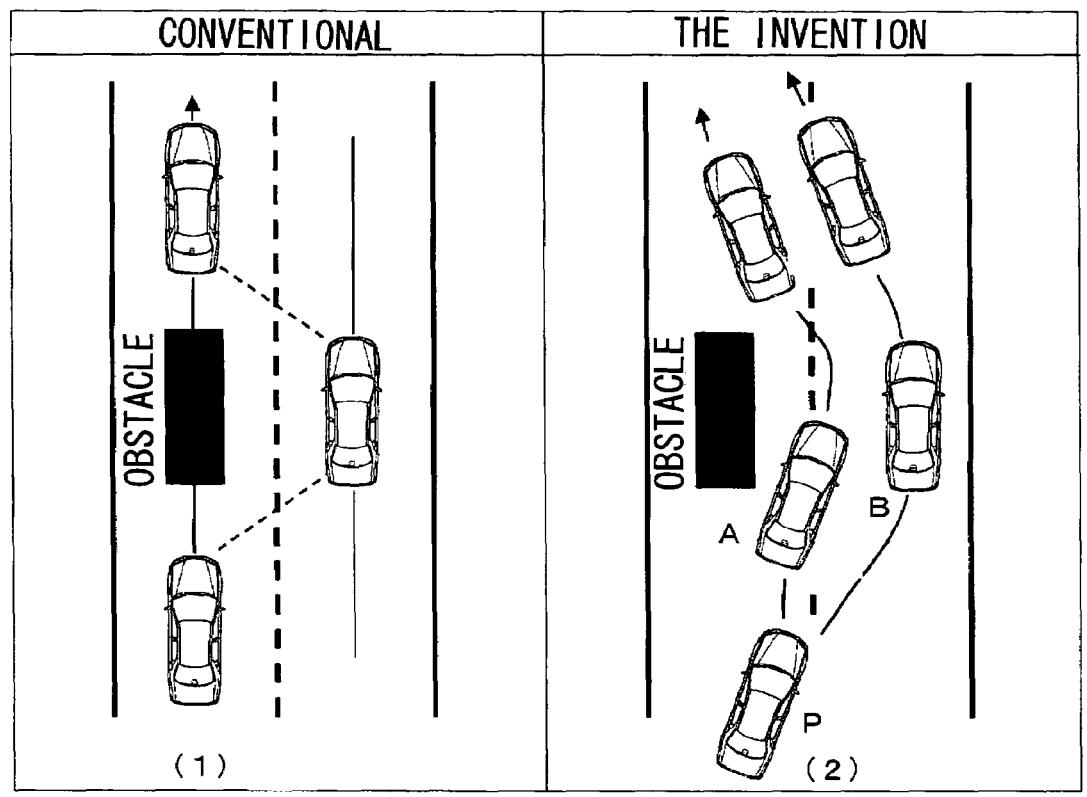
FIG. 16 illustrates the third exemplary embodiment.

FIG. 16 is to compare tracks of a mobile unit when avoiding an obstacle between conventional traffic simulators and the nano traffic simulator according to the present invention. Similarly to FIG. 15, FIG. 16 shows a situation in which an obstacle is in front of the mobile unit while it is traveling through a two-lane road.

In conventional traffic simulators, the track is fixed because the mobile unit must travel in accordance with a pattern of avoidance which is properly selected from several avoidance patterns that are prepared in advance in order to be able to cope with mobile unit conditions (e.g., speed), road traffic environments (e.g., vehicle width, traffic lights), attributes of obstacles (e.g., position, shapes) and so on. Besides, since obstacle avoidance is expressed by a transition between lanes, the track for avoiding an obstacle is represented as shown in (1) of FIG. 16.

In contrast, in the nano traffic simulator according to the present invention, a track of a mobile unit varies each time in accordance with parameters that are set respectively for driver models and vehicle dynamics models, conditions of mobile units (approaching speed and/or angle). For example, tracks A and B illustrated in (2) of FIG. 16 are for the same situation in which an avoidance action starts at a point P. Track B makes a larger outward movement than track A. Track A is a possible track the mobile unit may take when it is traveling at a low speed, and track B is a possible track the mobile unit may take when it is traveling at a high speed A.

Thus, according to the present invention, there is no need to prepare in advance various avoidance patterns because impassability level from driver's view distributions are dynamically generated in accordance with conditions of mobile units, road traffic environments and attributes of obstacles. Moreover, a target direction for a mobile unit is determined based on a distribution of impassability levels and also each driver model is provided with its own parameter which can be regarded as its personality, so that the track is not necessarily constant but varies with the conditions.

It should be noted that the track through which the mobile unit actually travels is not necessarily the same as the set path because of the same reason as described above.

Figure 17:
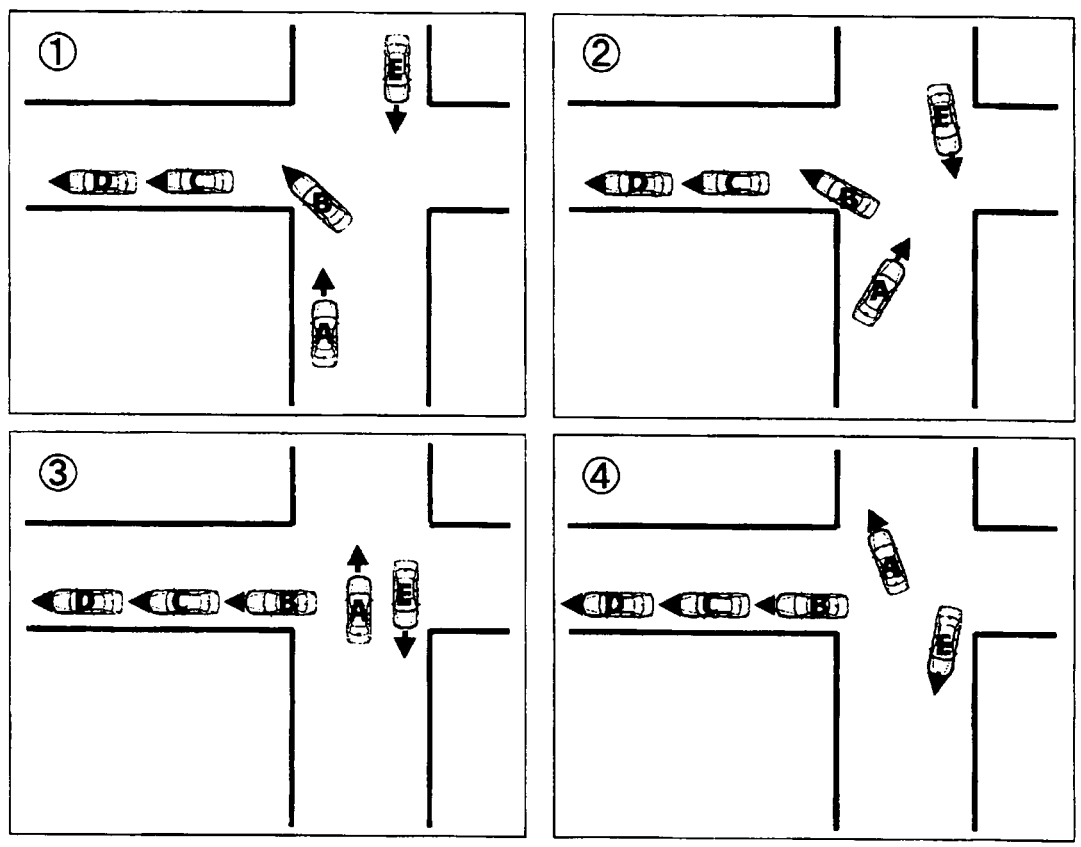
FIG. 17 illustrates the fourth exemplary embodiment.

5.4. Exemplary Embodiment 4—Behaviors of Mobile Units Passing Through a Road Crossing FIG. 17 shows behaviors of plural mobile units passing through the same 2-lane/1-lane crossing as shown in FIG. 4. In this example, since each mobile unit is provided with a driver model and a vehicle dynamics model, each mobile unit considers the surrounding conditions to travel autonomously.

Scenes 1 to 4 in FIG. 17 show a sequence of scenes in which opposite two mobile units are passing through the crossing. An arrow indicated in front of each mobile unit represents a target direction of the corresponding mobile unit.

In the scene 1, mobile units A and E approaches the crossing when a mobile unit B is turning to the left at the crossing. Unit A is influenced by the impassability level from driver's view of unit B, so that it changes the target direction toward the right side for traveling through the crossing. Unit E makes no change to the target direction because it receives no influence from B. However, in the scene 2, since units A and E receive influence from each other, their target directions are changed and they travel to pass each other. Then, in the scene 3, since both A and E come to a situation in which they have no influence from each other, their target directions are changed to move toward the original paths and finally they travel through those original paths (scene 4).

Again, it should be noted that these scenes are not realized by the rules for each scene but are realized through calculation of impassability level from driver's views by the driver models for each mobile unit.

According to the present invention, in the road traffic simulation apparatus that simulates mutual relationship in the road traffics by a plurality of mobile units, it is possible to represent detailed behaviors of the vehicles because each mobile unit is configured with a combination of a driver model, a model of driving operations of a driver, and a vehicle dynamics model, a model of behaviors of the mobile unit. The mobile units travel independently to each other in the simulation environment.

Besides, because each mobile unit is designed to travel autonomously based on the impassability levels which are calculated from the passable zones and the impassable zones provided in the road traffic environment database, there is no need to generate specific rules separately in order to cope with various traffic situations.

What is claimed is:

1. A computer implemented road traffic simulation apparatus representing a plurality of mobile units and traffic environments on a computer for simulating traffic situations in association with the mobile units, comprising:

a mobile unit model including a driver model, a model of driving operations by a virtual driver, and a vehicle dynamics model, a model of physical behavior of each mobile unit;

means for assigning impassability levels in terms of numerical values to impassable zones and other mobile units and to restrictions by traffic regulations and by traffic facilities which restrict movement of one mobile unit of said mobile unit model and which are unitarily represented by the impassability levels indicating levels of difficulty for said one mobile unit to travel; and means for moving said one mobile unit in said traffic environments in accordance with distribution of said impassability levels and a set route or a target route of said one mobile unit;

wherein the impassability level is a relative value with areas where the mobile unit cannot travel or not allowed to travel given a maximum value and with areas where the mobile unit may travel without difficulty given a minimum value.

2. The road traffic simulation apparatus as claimed in claim 1, further comprising a traffic environment database, said database including passable zone data for representing areas in which the mobile units can travel and impassable zone data for representing impassable zones in which the mobile units are unable to travel or are not permitted to travel.

3. The road traffic simulation apparatus as claimed in claim 1, wherein each of the impassability levels of the impassable zones is converted to an impassability level in each direction in a view file of said driver model in accordance with a distance between each mobile unit model and the relevant impassable zone.

4. The road traffic simulation apparatus as claimed in claim 3, wherein the driver model autonomously determines a speed and a direction for the relevant mobile unit model to travel based on the impassability level from driver's view.

5. The road traffic simulation apparatus as claimed in claim 4, wherein the driver model performs a process for converting the determined speed and direction into a driving operation value to be provided to the vehicle dynamics model.

6. The road traffic simulation apparatus as claimed in claim 1, wherein the impassability levels are calculated in accordance with certain rules.

7. The road traffic simulation apparatus as claimed in claim 6, wherein each of the vehicle dynamics models is a high freedom model that has a precision to allow for use in a driving simulator.

8. The road traffic simulation apparatus as claimed in claim 7, further comprising a driving simulator, wherein input relating to driving operations of an operator of the driving simulator is provided directly to the vehicle dynamics model for one of the plurality of mobile units.

9. The road traffic simulation apparatus as claimed in claim 8, wherein parameters for determining a behavior of at least one of the driver model and the vehicle dynamics model are different for each mobile unit model.

10. A computer readable medium storing a road traffic simulation program that is configured to represent a plurality of mobile units and road traffic environments on a computer, when executed on the computer, said program performing:
  representing a plurality of mobile units, each mobile unit being represented by a driver model of driving operations by a virtual driver and a vehicle dynamics model of a physical behavior of each mobile unit;
  assigning impassability levels in terms of numerical values to impassable zones and other mobile units and to restrictions by traffic regulations and by traffic facilities which restrict movement of one mobile unit of said mobile unit model and which are unitarily represented by the impassability levels indicating levels of difficulty for said one mobile unit to travel; and
  moving said one mobile unit in said traffic environments in accordance with distribution of said impassability levels and a set route or a target route of said one mobile unit;
  wherein the impassability level is a relative value with areas where the mobile unit cannot travel or not allowed to travel given a maximum value and with areas where the mobile unit may travel without difficulty given a minimum value.

11. A method of performing computer implemented simulation of road traffic involving a plurality of mobile units and traffic environments, comprising the steps of:
  preparing a mobile unit model having a driver model, a model of driving operations by a virtual driver, and a vehicle dynamics model, a model of physical behavior of each mobile unit;
  assigning impassability levels in terms of numerical values to impassable zones and other mobile units and to restrictions by traffic regulations and by traffic facilities which restrict movement of one mobile unit of said mobile unit model and which are unitarily represented by the impassability levels indicating levels of difficulty for said one mobile unit to travel; and
  moving said one mobile unit in said traffic environments in accordance with distribution of said impassability levels and a set route or a target route of said one mobile unit;
  wherein the impassability level is a relative value with areas where the mobile unit cannot travel or not allowed to travel given a maximum value and with areas where the mobile unit may travel without difficulty given a minimum value.

12. A computer implemented road traffic simulation apparatus representing a plurality of mobile units and traffic environments on a computer for simulating traffic situations in association with the mobile units, comprising:
  a mobile unit model including a driver model, a model of driving operations by a virtual driver, and a vehicle dynamics model, a model of physical behavior of each mobile unit;
  means for assigning impassability levels in terms of numerical values to impassable zones and other mobile units and to restrictions by traffic regulations and by traffic facilities which restrict movement of one mobile unit of said mobile unit model and which are unitarily represented by the impassability levels indicating levels of difficulty for said one mobile unit to travel;
  means for moving said one mobile unit in said traffic environments in accordance with said impassability levels; and
  means for changing said impassability levels in accordance with change over time of operating status of road facilities;
  wherein the impassability level is a relative value with areas where the mobile unit cannot travel or not allowed to travel given a maximum value and with areas where the mobile unit may travel without difficulty given a minimum value.

13. The road traffic simulation apparatus as claimed in claim 12, further comprising a traffic environment database, said database including passable zone data for representing areas in which the mobile units can travel and impassable zone data for representing impassable zones in which the mobile units are unable to travel or are not permitted to travel.

14. The road traffic simulation apparatus as claimed in claim 12, wherein each of the impassability levels of the impassable zones is converted to an impassability level in each direction in a view file of said driver model in accordance with a distance between each mobile unit model and the relevant impassable zone.

15. The road traffic simulation apparatus as claimed in claim 14, wherein the driver model autonomously determines a speed and a direction for the relevant mobile unit model to travel based on the impassability level from driver's view.

16. The road traffic simulation apparatus as claimed in claim 15, wherein the driver model performs a process for converting the determined speed and direction into a driving operation value to be provided to the vehicle dynamics model.

17. The road traffic simulation apparatus as claimed in claim 16, wherein the impassability levels are calculated in accordance with certain rules.

18. The road traffic simulation apparatus as claimed in claim 17, wherein each of the vehicle dynamics models is a high freedom model that has a precision to allow for use in a driving simulator.

* * * * *